(12) United States Patent
Kakiuchi et al.

(10) Patent No.: US 7,781,146 B2
(45) Date of Patent: *Aug. 24, 2010

(54) OPTICAL RECORDING MEDIUM

(75) Inventors: Hironori Kakiuchi, Tokyo (JP);
Hiroyasu Inoue, Tokyo (JP)

(73) Assignee: TDK Corporation, Tokyo (JP)

( * ) Notice: Subject to any disclaimer, the term of this patent is extended or adjusted under 35 U.S.C. 154(b) by 546 days.

This patent is subject to a terminal disclaimer.

(21) Appl. No.: 10/717,831

(22) Filed: Nov. 20, 2003

(65) Prior Publication Data

US 2004/0110086 A1    Jun. 10, 2004

(30) Foreign Application Priority Data

Nov. 22, 2002  (JP)  .............................. 2002-339857

(51) Int. Cl.
*G11B 7/24*  (2006.01)

(52) U.S. Cl. .................. 430/270.12; 430/945; 369/283; 369/288; 428/64.4

(58) Field of Classification Search ........................ None
See application file for complete search history.

(56) References Cited

U.S. PATENT DOCUMENTS

| | | | |
|---|---|---|---|
| 3,959,799 A | 5/1976 | Gambino et al. | 346/135 |
| 4,357,616 A | 11/1982 | Terao et al. | 346/135.1 |
| 4,405,706 A | 9/1983 | Takahashi et al. | 430/271 |
| 4,477,819 A | 10/1984 | Lee et al. | 346/76 L |
| 4,500,889 A | 2/1985 | Wada et al. | 346/1.1 |

(Continued)

FOREIGN PATENT DOCUMENTS

CN    1330368 A    1/2002

(Continued)

OTHER PUBLICATIONS

Inoue, H., et al., "Inorganic Write-Once Disc for High Speed Recording," Jpn. J. Appl. Phys. vol. 42, part 1, No. 2B, pp. 1059-1061, Feb. 2003.

(Continued)

*Primary Examiner*—Martin J Angebranndt
(74) *Attorney, Agent, or Firm*—Seed IP Law Group PLLC

(57) ABSTRACT

An optical recording medium includes a substrate, a protective layer and a plurality of information recording layers between the substrate and the protective layer and capable of recording data in the plurality of information recording layers and reproducing data recorded in the plurality of information recording layers by projecting a laser beam via a light incidence plane constituted by one of the surfaces of the substrate and protective layer onto the plurality of information recording layers, each of the information recording layers other than a farthest information recording layer from the light incidence plane including two recording films, a first dielectric film located on the side of the light incidence plane with respect to the two recording films and containing an oxide as a primary component and added with nitrogen, and a second dielectric film located on the opposite side of the light incidence plane with respect to the two recording films and having a lower thermal conductivity than that of the first dielectric film. According to the thus constituted optical recording medium, it is possible to improve the heat radiation characteristic and the optical property of information recording layers other than the information recording layer farthest from the light incidence plane.

10 Claims, 14 Drawing Sheets

U.S. PATENT DOCUMENTS

| | | | | |
|---|---|---|---|---|
| 4,529,991 | A | 7/1985 | Wada et al. | 346/76 L |
| 4,587,533 | A | 5/1986 | Nakane et al. | 346/135.1 |
| 4,609,611 | A | 9/1986 | Sigyo et al. | 430/270 |
| 4,647,947 | A | 3/1987 | Takeoka et al. | 346/135.1 |
| 4,670,345 | A | 6/1987 | Morimoto et al. | 428/411.1 |
| 4,682,321 | A | 7/1987 | Takaoka et al. | 369/284 |
| 4,771,413 | A | 9/1988 | Nago | 369/109 |
| 4,772,897 | A | 9/1988 | Ohkawa | 346/135.1 |
| 5,194,363 | A | 3/1993 | Yoshioka et al. | 430/271 |
| 5,208,088 | A | 5/1993 | Tominaga et al. | 428/64 |
| 5,297,132 | A | 3/1994 | Takano et al. | 369/284 |
| 5,325,351 | A | 6/1994 | Uchiyama et al. | 369/275.1 |
| 5,328,813 | A | 7/1994 | Strandjord et al. | 430/321 |
| 5,401,330 | A | 3/1995 | Saito et al. | 136/259 |
| 5,414,451 | A | 5/1995 | Sugiyama et al. | 347/258 |
| 5,458,941 | A | 10/1995 | Hintz | 428/64.4 |
| 5,459,018 | A | 10/1995 | Akahira | 430/270 |
| 5,560,998 | A | 10/1996 | Oyamatsu et al. | 428/694 ML |
| 5,656,370 | A | 8/1997 | Murakami et al. | 428/332 |
| 5,818,808 | A | 10/1998 | Takada et al. | 369/116 |
| 5,871,881 | A | 2/1999 | Nishida et al. | 430/270.11 |
| 5,912,104 | A | 6/1999 | Hirotsune et al. | 430/270.13 |
| 5,948,496 | A | 9/1999 | Kinoshita et al. | 428/64.1 |
| 5,949,747 | A | 9/1999 | Miyashita et al. | 369/54 |
| 5,958,649 | A | 9/1999 | Hirotsune et al. | 430/270.13 |
| 6,033,752 | A | 3/2000 | Suzuki et al. | 428/64.1 |
| 6,096,399 | A | 8/2000 | Yoshinari et al. | 428/64.1 |
| 6,111,851 | A | 8/2000 | Ohki et al. | 369/286 |
| 6,143,469 | A | 11/2000 | Ohta et al. | 430/270.13 |
| 6,210,860 | B1 | 4/2001 | Fukano et al. | 430/270.12 |
| 6,231,945 | B1 | 5/2001 | Miyamoto et al. | 428/64.1 |
| 6,245,404 | B1 | 6/2001 | Saito et al. | 428/64.1 |
| 6,254,966 | B1 | 7/2001 | Kondo | 428/156 |
| 6,266,299 | B1 | 7/2001 | Oshima et al. | 369/275.1 |
| 6,278,680 | B1 | 8/2001 | Miyauchi et al. | 369/112.01 |
| 6,333,913 | B1 | 12/2001 | Yoshinari et al. | 369/283 |
| 6,355,326 | B1 | 3/2002 | Lee et al. | 428/64.1 |
| 6,404,712 | B1 | 6/2002 | Lee et al. | 369/47.53 |
| 6,404,713 | B1 | 6/2002 | Ueki | 369/47.53 |
| 6,416,837 | B1 | 7/2002 | Kojima et al. | 428/64.1 |
| 6,449,239 | B1 * | 9/2002 | Uno et al. | 369/275.1 |
| 6,528,138 | B2 | 3/2003 | Meinders et al. | 428/64.1 |
| 6,551,679 | B1 | 4/2003 | Kuroda et al. | 428/64.1 |
| 6,608,799 | B2 | 8/2003 | Hozumi | 369/13.26 |
| 6,611,481 | B1 | 8/2003 | Koishi et al. | 369/47.53 |
| 6,636,477 | B1 | 10/2003 | Miyamoto et al. | 369/286 |
| 6,656,559 | B2 | 12/2003 | Mizushima et al. | 428/64.1 |
| 6,660,451 | B1 | 12/2003 | Sakaue et al. | 430/270.13 |
| 6,670,014 | B2 | 12/2003 | Nishihara et al. | 428/64.1 |
| 6,751,184 | B2 | 6/2004 | Kojima et al. | 369/275.2 |
| 6,788,635 | B1 | 9/2004 | Aratani et al. | 369/100 |
| 6,791,926 | B1 | 9/2004 | Furumiya et al. | 369/53.13 |
| 6,805,935 | B2 | 10/2004 | Ashida et al. | 428/64.1 |
| 6,807,142 | B1 | 10/2004 | Nagata et al. | 369/275.2 |
| 6,841,218 | B2 | 1/2005 | Hosoda et al. | 428/64.1 |
| 6,929,840 | B2 | 8/2005 | Hosoda et al. | 428/64.1 |
| 6,982,111 | B2 | 1/2006 | Mizushima et al. | 428/64.1 |
| 6,996,055 | B2 | 2/2006 | Mishima et al. | 369/283 |
| 7,002,887 | B2 | 2/2006 | Kakiuchi et al. | 369/59.12 |
| 7,018,694 | B2 | 3/2006 | Hosoda et al. | 428/64.1 |
| 7,018,695 | B2 * | 3/2006 | Kakiuchi et al. | 428/64.1 |
| 7,142,496 | B2 | 11/2006 | Miyagawa et al. | 369/59.11 |
| 7,167,431 | B2 | 1/2007 | Miura et al. | 369/59.11 |
| 2001/0012257 | A1 | 8/2001 | Suzuki et al. | 369/94 |
| 2001/0017833 | A1 | 8/2001 | Yamada et al. | 369/59.11 |
| 2001/0021160 | A1 * | 9/2001 | Shuy et al. | 369/100 |
| 2001/0041304 | A1 | 11/2001 | Uno et al. | 430/270.13 |
| 2001/0044073 | A1 | 11/2001 | Fukano et al. | 430/270.12 |
| 2002/0060979 | A1 | 5/2002 | Tsukuda et al. | 369/275.4 |
| 2002/0076646 | A1 | 6/2002 | Zhou et al. | 430/270.13 |
| 2002/0110063 | A1 | 8/2002 | Yamada et al. | 369/47.39 |
| 2002/0160306 | A1 | 10/2002 | Hanaoka et al. | 430/270.13 |
| 2002/0168587 | A1 * | 11/2002 | Sakaue et al. | 430/270.13 |
| 2003/0086359 | A1 | 5/2003 | Lee et al. | 369/275.3 |
| 2003/0134229 | A1 | 7/2003 | Yasuda et al. | 430/270.13 |
| 2003/0165111 | A1 | 9/2003 | Flynn | 369/288 |
| 2003/0190551 | A1 * | 10/2003 | Aoshima et al. | 430/270.12 |
| 2003/0202452 | A1 * | 10/2003 | Mishima et al. | 369/112.23 |
| 2003/0223351 | A1 * | 12/2003 | Aoshima et al. | 369/288 |
| 2003/0224215 | A1 | 12/2003 | Kondo et al. | 428/694 ML |
| 2003/0228539 | A1 | 12/2003 | Hosoda et al. | 430/270.13 |
| 2003/0231577 | A1 * | 12/2003 | Mishima et al. | 369/283 |
| 2004/0001418 | A1 | 1/2004 | Shinotsuka et al. | 369/111 |
| 2004/0004932 | A1 * | 1/2004 | Inoue et al. | 369/283 |
| 2004/0013069 | A1 | 1/2004 | Uno et al. | 369/59.11 |
| 2004/0018334 | A1 | 1/2004 | Nee | 428/64.1 |
| 2004/0027652 | A1 | 2/2004 | Erdogan et al. | 359/359 |
| 2004/0027973 | A1 | 2/2004 | Aoshima et al. | 369/121 |
| 2004/0038080 | A1 * | 2/2004 | Inoue et al. | 428/694 SC |
| 2004/0052176 | A1 | 3/2004 | Narumi et al. | 369/47.39 |
| 2004/0052194 | A1 * | 3/2004 | Inoue et al. | 369/112.23 |
| 2004/0076907 | A1 * | 4/2004 | Inoue et al. | 430/270.12 |
| 2004/0139459 | A1 * | 7/2004 | Mishima et al. | 720/718 |
| 2004/0152016 | A1 * | 8/2004 | Mishima et al. | 430/270.12 |
| 2004/0157158 | A1 * | 8/2004 | Kakiuchi et al. | 430/270.12 |
| 2004/0174796 | A1 * | 9/2004 | Mizushima et al. | 369/94 |
| 2004/0174804 | A1 * | 9/2004 | Kakiuchi et al. | 369/275.4 |
| 2004/0190435 | A1 * | 9/2004 | Hosoda et al. | 369/283 |
| 2004/0191685 | A1 * | 9/2004 | Kakiuchi et al. | 430/270.11 |
| 2004/0202097 | A1 * | 10/2004 | Oyake et al. | 369/283 |
| 2004/0241581 | A1 | 12/2004 | Kakiuchi et al. | 430/270.12 |
| 2005/0018590 | A1 | 1/2005 | Inoue et al. | 369/275.2 |
| 2005/0018591 | A1 | 1/2005 | Inoue et al. | 369/275.2 |
| 2005/0018592 | A1 | 1/2005 | Inoue et al. | 369/275.2 |
| 2005/0047301 | A1 | 3/2005 | Inoue et al. | 369/94 |
| 2005/0047302 | A1 | 3/2005 | Inoue et al. | 369/94 |
| 2005/0047303 | A1 | 3/2005 | Inoue et al. | 369/94 |
| 2005/0047304 | A1 | 3/2005 | Inoue et al. | 369/94 |
| 2005/0047305 | A1 | 3/2005 | Inoue et al. | 369/94 |
| 2005/0047306 | A1 | 3/2005 | Inoue et al. | 369/94 |
| 2005/0048249 | A1 | 3/2005 | Inoue et al. | 428/64.4 |
| 2005/0094526 | A1 * | 5/2005 | Kakiuchi et al. | 369/59.11 |
| 2005/0243676 | A1 * | 11/2005 | Kato et al. | 369/59.11 |
| 2006/0013111 | A1 * | 1/2006 | Inoue et al. | 369/125 |
| 2006/0078825 | A1 * | 4/2006 | Inoue et al. | 430/270.12 |

FOREIGN PATENT DOCUMENTS

| | | |
|---|---|---|
| CN | 1365108 A | 8/2002 |
| EP | 0350078 A1 | 1/1990 |
| EP | 0474311 A1 | 3/1992 |
| EP | 0822543 A1 | 2/1998 |
| EP | 0978831 A2 | 2/2000 |
| EP | 1028421 A2 | 8/2000 |
| EP | 1122723 A1 | 8/2001 |
| EP | 1154413 A2 | 11/2001 |
| EP | 1215669 A2 | 6/2002 |
| EP | 0947351 B1 | 9/2002 |
| EP | 1351230 A2 | 10/2003 |
| EP | 1139340 B1 | 6/2004 |
| GB | 2336463 | 10/1999 |
| JP | 48-00038 | 1/1973 |
| JP | 54-133134 | 10/1979 |
| JP | 56-124134 | 9/1981 |
| JP | 57-027788 | 2/1982 |
| JP | 59-225992 | 12/1984 |
| JP | 60-160036 | 8/1985 |
| JP | 60-219097 | 11/1985 |
| JP | 62-204442 | 9/1987 |
| JP | 62-226440 | 10/1987 |
| JP | 62-226442 | 10/1987 |
| JP | 62-245545 | 10/1987 |
| JP | 1-270528 | 10/1989 |
| JP | 02078041 A | 3/1990 |

| | | |
|---|---|---|
| JP | 03-005929 | 1/1991 |
| JP | 3-49054 | 3/1991 |
| JP | 03-258590 | 11/1991 |
| JP | 4-298389 | 10/1992 |
| JP | 05-159358 | 6/1993 |
| JP | 05-169819 A | 7/1993 |
| JP | 05-342631 | 12/1993 |
| JP | 05-342635 | 12/1993 |
| JP | 6-171236 | 6/1994 |
| JP | 6-262854 | 9/1994 |
| JP | 07057318 A | 3/1995 |
| JP | 7-235465 | 9/1995 |
| JP | 9-007176 | 1/1997 |
| JP | 10-076755 | 3/1998 |
| JP | 10-143919 | 5/1998 |
| JP | 2000-187884 | 7/2000 |
| JP | 2000-222764 | 8/2000 |
| JP | 2000-285509 | 10/2000 |
| JP | 2000-297365 | 10/2000 |
| JP | 2001-101709 | 4/2001 |
| JP | 2001126324 A | 5/2001 |
| JP | 2001-222819 | 8/2001 |
| JP | 2001-243655 | 9/2001 |
| JP | 2001-266402 | 9/2001 |
| JP | 2001-322357 | 11/2001 |
| JP | 2002-120458 | 4/2002 |
| JP | 2002-269808 | 9/2002 |
| JP | 2002-329348 | 11/2002 |
| JP | 2003-054135 | 2/2003 |
| JP | 2003-105738 | 4/2003 |
| JP | 2003-178448 | 6/2003 |
| JP | 2003-260874 | 9/2003 |
| JP | 2003-326848 | 11/2003 |
| JP | 2004-039177 | 2/2004 |
| JP | 2004-087073 | 3/2004 |
| JP | 2004-158134 | 6/2004 |
| WO | 01/93256 A1 | 12/2001 |
| WO | 02/29787 | 4/2002 |
| WO | 03/025924 | 3/2003 |

OTHER PUBLICATIONS

Narumi, K. et al., "45 GB Rewritable Dual-Layer Phase-Change Optical Disk with a Transmittance Balanced Structure," Technical Digest, International Symposium on Optical Memory 2001, Grand Hotel, Taipei, Taiwan, Oct. 16-19, 2001, pp. 202-203.
Nikkei Electronics, May 12, 2003, pp. 119-133, (in Japanese).
Japanese Office Action, mailing date Feb. 24, 2009 re Japanese Patent Application No. 2003-387733, 3 pgs.

* cited by examiner

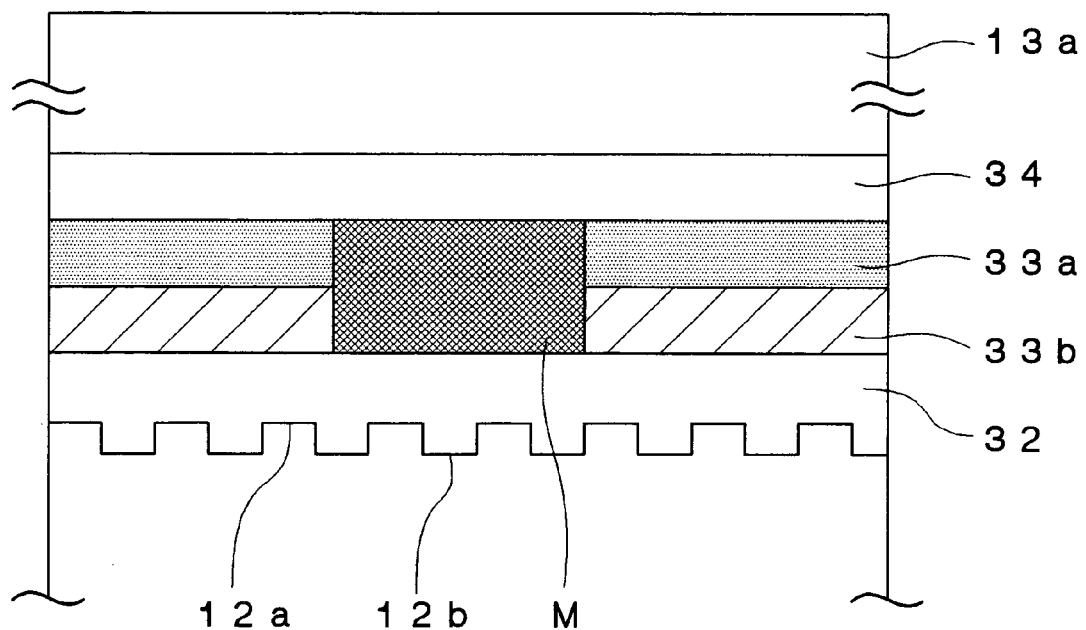
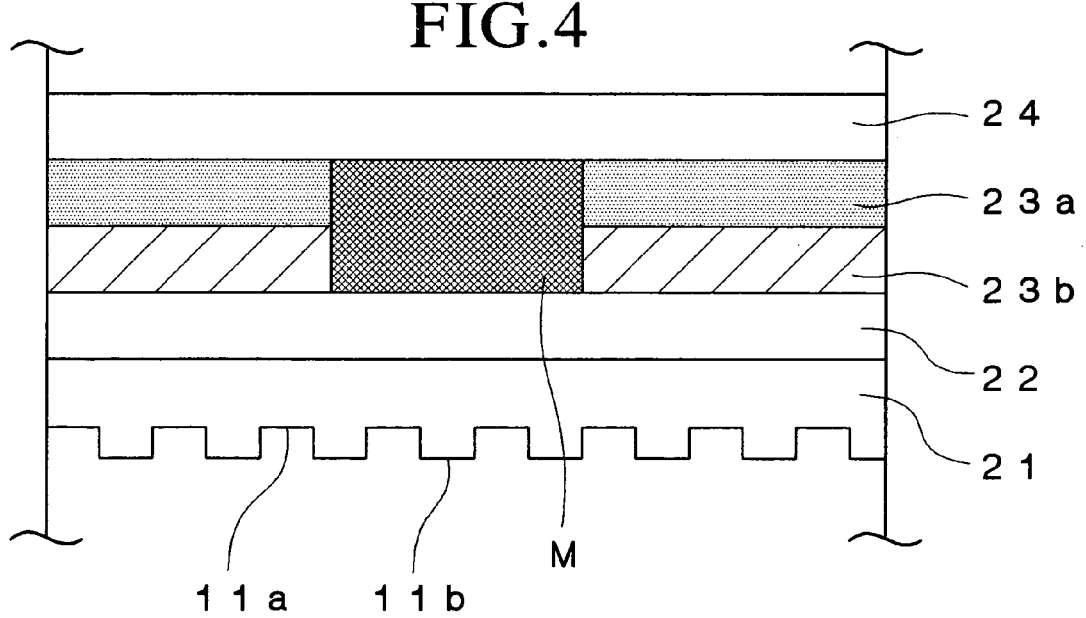

OPTICAL RECORDING MEDIUM

BACKGROUND OF THE INVENTION

The present invention relates to an optical recording medium, and particularly, to an optical recording medium which includes a plurality of information recording layers and in which the heat radiation characteristic and the optical property of information recording layer(s) other than the information recording layer farthest from a light incidence plane are improved.

DESCRIPTION OF THE PRIOR ART

Optical recording media such as the CD, DVD and the like have been widely used as recording media for recording digital data. Such optical recording media require improvement in ability to record large amounts of data and various proposals have been made in order to increase the data recording capacity thereof.

One of these is an optical recording medium having two information recording layers and such an optical recording medium has been already put to the practical use as an optical recording medium adapted to enable only data reading, such as the DVD-Video and the DVD-ROM.

An optical recording medium adapted only for reading data and provided with two information recording layers is formed by laminating two substrates each having prepits constituting an information recording layer on the surface thereof via an intermediate layer.

Further, an optical recording medium having two information recording layers has been recently proposed in connection with optical recording media in which data can be recorded by the user (See Japanese Patent Application Laid Open No. 2001-243655 etc.).

In the optical recording medium disclosed in Japanese Patent Application Laid Open No. 2001-243655, each recording layer includes a recording film formed of a phase change material and dielectric films (protective films) sandwiching the recording film therebetween and two information recording layers each having such a configuration are laminated via an intermediate layer.

In the case where data are to be recorded in an optical recording medium having a plurality of recording films in which data can be recorded by the user, a laser beam whose power is modulated so as to be equal to a recording power Pw higher than a reproducing power Pr is focused onto one or the other of the information recording layers and projected thereonto, thereby changing the state of a recording film included in the information recording layer irradiated with the laser beam and forming a record mark in the recording film. Since the reflection coefficients differ between the region of the recording film where a record mark is formed and blank regions of the recording film, data can be reproduced by projecting a laser beam whose power is set to a reproducing power Pr onto the recording film and detecting an amount of the laser beam reflected by the recording film.

In an optical recording medium including a plurality of information recording layers, namely, an L0 layer, an L1 layer, an L2 layer, an L3 layer, an L4 layer, . . . and an Lm layer, where the L0 layer is the farthest information recording layer from the light incident plane and the Lm layer is the closest information recording layer to the light incident plane, recording data of data in and reproduction of data from the L0 layer is accomplished by projecting a laser beam onto the L0 layer via the L1 layer, the L2 layer, the L3 layer, the L4 layer, . . . and the Lm layer. Therefore, in order to record data in or reproduce data from the information recording layer farther from the light incident plane in a desired manner, it is necessary for each of information recording layers located closer to the light incident plane than the information recording layer to have a sufficiently high light transmittance and it is accordingly usual for each of them to have no reflective film or to have only an extremely thin reflective film.

In the optical recording medium having a plurality of information recording layers, since each of the L1 layer, the L2 layer, the L3 layer, the L4 layer, . . . and the Lm layer has no reflective film or has only an extremely thin reflective film, a sufficient enhancement effect cannot be obtained. As a result, it is difficult to obtain sufficiently high output (modulation) of a signal in the L1 layer, the L2 layer, the L3 layer, the L4 layer, . . . or the Lm layer.

In order to solve such a problem, it might be considered effective to employ a material having a high refractive index n for forming a dielectric film included in the L1 layer, the L2 layer, the L3 layer, the L4 layer, . . . or the Lm layer. However, if a material having a high refractive index n is employed for forming a dielectric film included in the L1 layer, the L2 layer, the L3 layer, the L4 layer, . . . or the Lm layer, the extinction coefficient k of the dielectric film increases.

In addition, since no or only a very low heat radiation effect can be obtained in the L1 layer, the L2 layer, the L3 layer, the L4 layer, . . . or the Lm layer, heat generated by a laser beam is not readily radiated, thereby degrading the signal characteristic.

In order to solve such a problem, it might be considered effective to employ a material having a high thermal conductivity for forming a dielectric film included in the L1 layer, the L2 layer, the L3 layer, the L4 layer, . . . or the Lm layer. However, when a material having a high thermal conductivity is employed for forming a dielectric film included in the L1 layer, the L2 layer, the L3 layer, the L4 layer, . . . or the Lm layer, it is difficult to simultaneously obtain a high heat radiation characteristic and a high optical characteristic.

SUMMARY OF THE INVENTION

It is therefore an object of the present invention to provide an optical recording medium which includes a plurality of information recording layers and in which the heat radiation characteristic and the optical property of information recording layer(s) other than the information recording layer farthest from a light incidence plane are improved.

The inventors of the present invention vigorously pursued a study for accomplishing the above objects of the present invention and, as a result, made the discovery that it is possible to vary the dependency of the refractive index n and the extinction coefficient k on the wavelength of a laser beam by adding nitrogen to a dielectric layer containing an oxide as a primary component.

The present invention is based on this discovery and according to the present invention, the above and other objects can be accomplished by an optical recording medium comprising a substrate, a protective layer and a plurality of information recording layers between the substrate and the protective layer and capable of recording data in the plurality of information recording layers and reproducing data recorded in the plurality of information recording layers by projecting a laser beam via a light incidence plane constituted by one of the surfaces of the substrate and protective layer onto the plurality of information recording layers, at least one information recording layer other than a farthest information recording layer from the light incidence plane among the plurality of information recording layers including at least one recording film, a first dielectric film located on the side of the light incidence plane with respect to the at least one recording film and containing an oxide as a primary component and added with nitrogen, and a second dielectric film located on the opposite side of the light incidence plane with respect to the at least one recording film and having a lower thermal conductivity than that of the first dielectric film.

Since the refractive index n and the extinction coefficient k of some oxides among oxides widely used for forming a dielectric film greatly depend on the wavelength of the incident light, the refractive index n of the dielectric film becomes low or the extinction coefficient k of the dielectric film becomes high depending upon the wavelength of the laser beam used for recording and reproducing data and, in particular, if a dielectric film included in the L1 layer, the L2 layer, the L3 layer, the L4 layer, . . . or the Lm layer is formed of such an oxide in a next-generation type optical recording medium in which data are recorded and reproduced using a laser beam in the blue wavelength band, the extinction coefficient of the dielectric film becomes high and the energy of the laser beam absorbed in the dielectric film becomes great, whereby the recording sensitivity of the information recording layer farthest from the the light incidence plane, is lowered. However, according to the present invention, nitrogen is added to the first dielectric film located on the side of the light incidence plane with respect to the at least one recording film included in the information recording layer other than a farthest information recording layer from the light incidence plane and containing an oxide as a primary component, and since it is possible to vary the dependency of the refractive index n and the extinction coefficient k on the wavelength of a laser beam by adding nitrogen to the first dielectric film containing an oxide as a primary component, it is possible to form a first dielectric film having a high refractive index n and a low extinction coefficient k by controlling the amount of added nitrogen. Therefore, even in the case where no reflective film is provided or only an extremely thin reflective film is provided in the information recording layer other than the farthest information recording layer from the light incidence plane in order to record data in or reproduce data from the farthest information recording layer from the light incidence plane in a desired manner, it is possible to improve modulation of the information recording layer other than the farthest information recording layer from the light incidence plane and improve the recording sensitivity of the optical recording medium.

Further, according to the present invention, since the second dielectric film has a lower thermal conductivity than that of the first dielectric film, it is possible to effectively prevent the heat radiation characteristic of the information recording layer other than the farthest information recording layer from the light incidence plane from excessively increasing and the recording sensitivity of the information recording layer other than the farthest information recording layer from the light incidence plane from being lowered.

In the present invention, the first dielectric film preferably contains $Ta_2O_5$ or $TiO_2$ as a primary component. In the case where the first dielectric film contains $Ta_2O_5$ or $TiO_2$ as a primary component, when nitrogen is added to the first dielectric film, reduction in the extinction coefficient k is pronounced and it is therefore possible to markedly improve the recording sensitivity of the optical recording medium. Further, the refractive index n of the first dielectric film can be markedly increased and the extinction coefficient k of the first dielectric film can be prevented from increasing with respect to a laser beam in the blue wavelength band. Therefore, it is possible to markedly improve modulation of the information recording layer other than the farthest information recording layer from the light incidence plane particularly when a laser beam in the blue wavelength band is employed for recording and reproducing data and markedly improve the recording sensitivity of the optical recording medium.

In the present invention, the preferable amount of nitrogen added to the first dielectric film varies depending upon the kind of oxide contained in the first dielectric film as a primary component and the wavelength of the laser beam used for recording and reproducing data. In the case where a laser beam in the blue wavelength band, namely, a laser beam having a wavelength λ of 380 nm to 450 nm, is used for recording and reproducing data and the first dielectric film contains $Ta_2O_5$ as the primary component, it is preferable to add 1 to 12 atomic % of nitrogen and more preferable to add 2 to 10 atomic % of nitrogen to the first dielectric film, and when the first dielectric film contains $TiO_2$ as the primary component, it is preferable to add 1 to 5 atomic % of nitrogen and more preferable to add 2 to 4 atomic % of nitrogen to the first dielectric film. The amount of nitrogen added to the first dielectric film can be measured using an ESCA (X-ray photoelectron spectroscopy: XPS).

In the present invention, it is preferable to record data in the optical recording medium using a laser beam having a wavelength of 380 nm to 450 nm. The first dielectric film containing $Ta_2O_5$ or $TiO_2$ as a primary component has a high refractive index n and a low extinction coefficient k.

In the present invention, it is preferable for the second dielectric film to be formed of a mixture of ZnS and $SiO_2$.

The mixture of ZnS and $SiO_2$ can form a film at a high film forming rate with high productivity and has a relatively high refractive index n and a relatively low extinction coefficient k with respect to a blue laser beam having a wavelength λ of 380 nm to 450 nm. Further, since the mixture of ZnS and $SiO_2$ has a lower thermal conductivity than $Ta_2O_5$ or $TiO_2$, it is possible to effectively prevent the heat radiation characteristic of the information recording layer other than the farthest information recording layer from the light incidence plane from excessively increasing and the recording sensitivity of the information recording layer other than the farthest information recording layer from the light incidence plane from being lowered.

In a preferred aspect of the present invention, the at least one information recording layer is constituted by a first recording film containing one element selected from the group consisting of Si, Ge, Sn, Mg, In, Zn, Bi and Al as a primary component and a second recording film provided in the vicinity of the first recording film and containing one element selected from the group consisting of Cu, Al, Zn, Ti and Ag and different from the element contained in the first recording film as a primary component and when the laser beam is projected, the element contained in the first recording film as a primary component and the element contained in the second recording film as a primary component are mixed with each other, thereby forming a record mark.

In this specification, the statement that the first recording film contains a certain element as a primary component means that the content of the element is maximum among the elements contained in the first recording film, while the statement that the second recording film contains a certain element as a primary component means that the content of the element is maximum among the elements contained in the second recording film.

In a study done by the inventors of the present invention, it was found that in the case where the at least one information recording layer other than the farthest information recording layer from a light incidence plane among the plurality of information recording layers was formed so as to include a first recording film containing an element selected from the group consisting of Si, Ge, Sn, Mg, In, Zn, Bi and Al as a primary component and a second recording film containing an element selected from a group consisting of Cu, Al, Zn, Ti and Ag as a primary component, when data were recorded in the at least one information recording layer, the element contained in the first recording film as a primary component and the element contained in the second recording film as a primary component were mixed with each other by a laser beam, thereby forming a record mark whose reflection coefficient was different from those of other regions of the first recording film and the second recording film and data could be recorded in the at least one information recording layer with high sensitivity. The inventors of the present invention made the further discovery that the difference in light transmittances for a laser beam having a wavelength of 380 nm to 450 nm between a region where a record mark was formed and a blank region was equal to or lower than 4% and in the case of recording data in the farthest information recording layer from a light incidence plane or reproducing data from the farthest information recording layer from a light incidence plane by irradiating it with a laser beam having a wavelength of 380 nm to 450 nm via the at least one information recording layer, even if a region of the information recording layer through which the laser beam is transmitted contained a boundary between a region where a record mark is formed and a blank region, it was possible to record data in the farthest information recording layer from a light incidence plane and reproduce data from the farthest information recording layer from the light incidence plane in a desired manner.

In the present invention, it is not absolutely necessary for the second recording film to be in contact with the first recording film and it is sufficient for the second recording film to be so located in the vicinity of the first recording film as to enable formation of a mixed region including the primary component element of the first recording film and the primary component element of the second recording film when the region is irradiated with a laser beam. Further, one or more other films such as a dielectric film may be interposed between the first recording film and the second recording film.

In the present invention, it is preferable to form the second recording film to be in contact with the first recording film.

In the present invention, the farthest layer from the light incidence plane may include one or more recording films containing an element selected from the group consisting of Si, Ge, Sn, Mg, In, Zn, Bi and Al as a primary component or one or more recording films containing an element selected from a group consisting of Cu, Al, Zn, Ti and Ag as a primary component in addition to the first recording film and the second recording film.

Although the reason why a record mark region including the mixture of the primary component element of the first recording film and the primary component element of the second recording film can be formed when irradiated with a laser beam is not altogether clear, it is reasonable to conclude that the primary component elements of the first and second recording film are partially or totally fused or diffused, thereby forming a region where the primary component elements of the first and second recording films mix.

In this manner, the reflection coefficient of a region formed by mixing the element contained in the first recording film as a primary component and the element contained in second recording film as a primary component with respect to a laser beam for reproducing data is greatly different from those of other regions in the first recording film and the second recording film. It is therefore possible to reproduce recorded data utilizing such large difference in the reflection coefficients, thereby obtaining a reproduced signal having an improved C/N ratio.

Further, the inventors found that these elements apply only light load to the environment and that the information recording layers including these elements have excellent surface smoothness.

In the present invention, it is preferable for the first recording film to contain Si as a primary component.

In the present invention, it is preferable for the second recording film to contain Cu as a primary component.

The initial recording characteristic can be particularly improved in comparison with conventional optical recording media when the second recording film containing Cu as a primary component is formed by a vacuum deposition process or a sputtering process because the surface smoothness thereof becomes very good. Since the recording films of the optical recording medium according to the present invention therefore have excellent surface smoothness, it is possible to markedly improve the recording characteristic when data are recorded by a laser beam having a reduced spot diameter. Moreover, since Cu is quite inexpensive, the cost of the materials used to fabricate the optical recording medium can be minimized.

In the present invention, it is preferable to add at least one element selected from the group consisting of Al, Zn, Sn, Mg and Au and different from the element contained in the second information recording layer as a primary component to the second recording film.

In the case where at least one element selected from the group consisting of Al, Zn, Sn and Au and different from the element contained in the second information recording layer as a primary component is added to the second recording film in this manner, it is possible to markedly improve the stability of the second recording film against oxidation or sulfurization and to effectively prevent degradation of the appearance of the optical recording medium, such as by peeling of the second recording film and the like owing to corrosion of Cu or the like contained in the second recording film as a primary component, and change in the reflection coefficient of the optical recording medium during long storage.

In a preferred aspect of the present invention, the protective layer is formed of a light transmittable material and the laser beam is projected onto the plurality of information recording layers via the protective layer.

The above and other objects and features of the present invention will become apparent from the following description made with reference to the accompanying drawings.

BRIEF DESCRIPTION OF THE DRAWINGS

FIG. 3 is a schematic enlarged cross-sectional view showing the optical recording medium shown in FIG. 1 after an L1 layer was irradiated with a laser beam.

FIG. 4 is a schematic enlarged cross-sectional view showing the optical recording medium shown in FIG. 1 after an L0 layer was irradiated with a laser beam.

DESCRIPTION OF THE PREFERRED EMBODIMENTS

Figure 1:
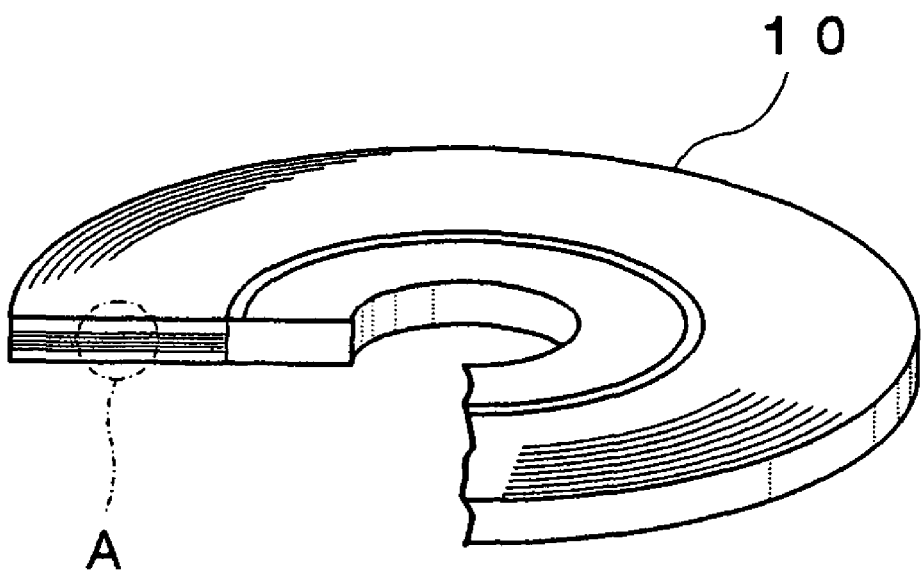
FIG. 1 is a schematic perspective view showing an optical recording medium that is a preferred embodiment of the present invention.
Figure 2:
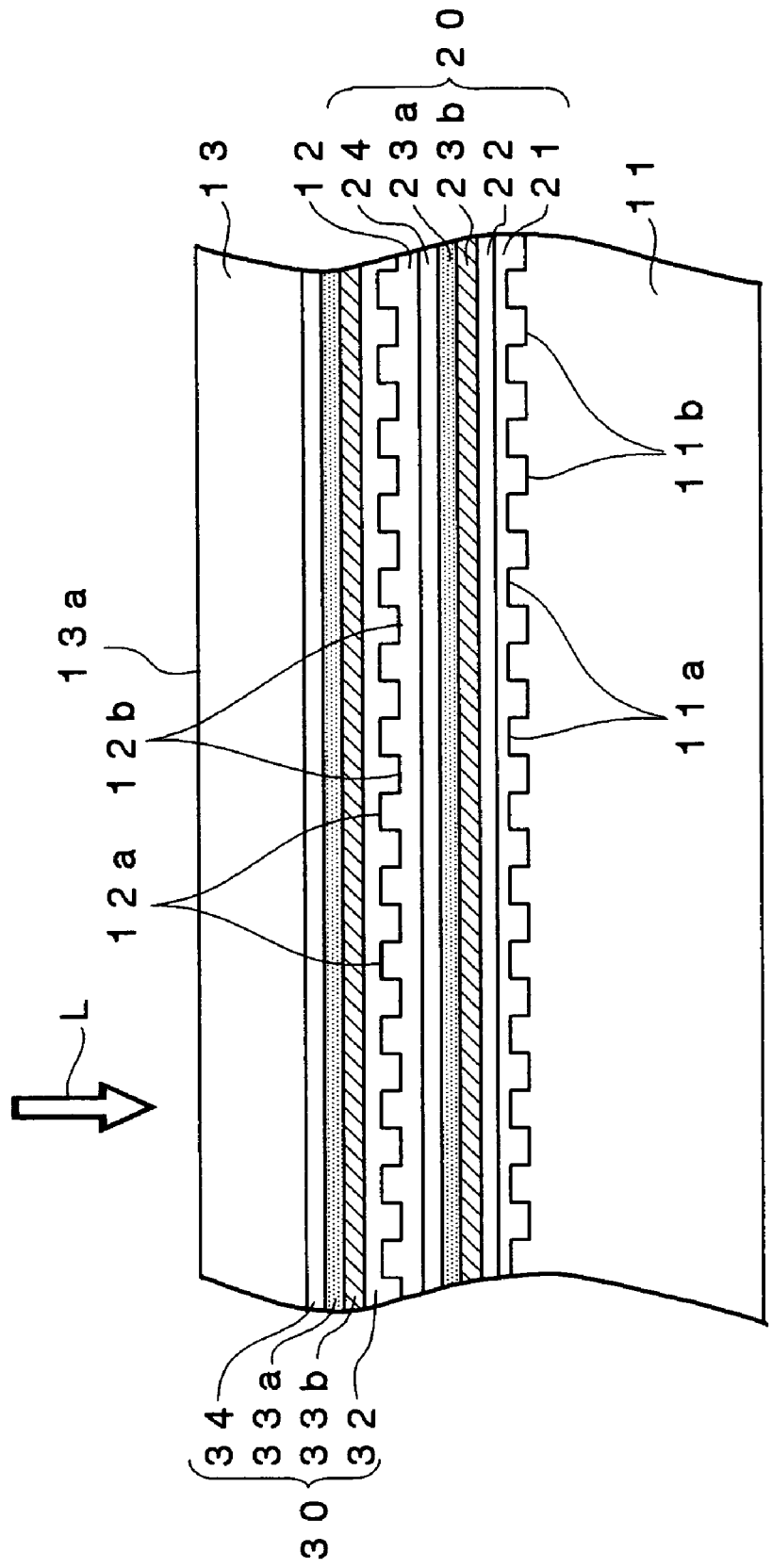
FIG. 2 is an enlarged schematic cross-sectional view of the part of the optical recording medium indicated by A in FIG. 1.

FIG. 1 is a schematic perspective view showing an optical recording medium that is a preferred embodiment of the present invention and FIG. 2 is a schematic enlarged cross-sectional view indicated by A in FIG. 1.

As shown in FIG. 1, an optical recording medium 10 according to this embodiment is formed disk-like and has a outer diameter of about 120 mm and a thickness of about 1.2 mm.

As shown in FIG. 2, the optical recording medium 10 according to this embodiment includes a disk-like support substrate 11, a transparent intermediate layer 12, a light transmission layer (protective layer) 13, an L0 layer 20 formed between the support substrate 11 and the transparent intermediate layer 12, and an L1 layer 30 formed between the transparent layer 12 and the light transmission layer 13.

The L0 layer 20 and the L1 layer 30 are information recording layers in which data are recorded, i.e., the optical recording medium 10 according to this embodiment includes two information recording layers.

The L0 layer 20 constitutes an information recording layer far from a light incident plane 13a and is constituted by laminating a reflective film 21, a fourth dielectric film 22, a first L0 recording film 23a, a second L0 recording film 23b and a third dielectric film 24 from the side of the support substrate 11.

On the other hand, the L1 layer 30 constitutes an information recording layer close to the light incident plane 13a and is constituted by laminating a second dielectric film 32, a first L1 recording film 33a, a second L1 recording film 33b and a first dielectric film 34.

The support substrate 11 serves as a support for ensuring mechanical strength and a thickness of about 1.2 mm required for the optical recording medium 10.

The material used to form the support substrate 11 is not particularly limited insofar as the support substrate 11 can serve as the support of the optical recording medium 10. The support substrate 11 can be formed of glass, ceramic, resin or the like. Among these, resin is preferably used for forming the support substrate 11 since resin can be easily shaped. Illustrative examples of resins suitable for forming the support substrate 11 include polycarbonate resin, polyolefin resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin and polyolefin resin are most preferably used for forming the support substrate 11 from the viewpoint of easy processing, optical characteristics and the like and in this embodiment, the support substrate 11 is formed of polycarbonate resin. In this embodiment, since the laser beam L is projected via the light incident plane 13a located opposite to the support substrate 11, it is unnecessary for the support substrate 11 to have a light transmittance property.

As shown in FIG. 2, grooves 11a and lands 11b are alternately and spirally formed on the surface of the support substrate 11 so as to extend from a portion in the vicinity of the center of the support substrate 11 toward the outer circumference. The grooves 11a and/or lands 11b serve as a guide track for the laser beam L when data are to be recorded in the L0 layer 20 or when data are to be reproduced from the L0 layer 20.

The depth of the groove 11a is not particularly limited and is preferably set to 10 nm to 40 nm. The pitch of the grooves 11a is not particularly limited and is preferably set to 0.2 μm to 0.4 μm.

The transparent intermediate layer 12 serves to space the L0 layer 20 and the L1 layer 30 apart by a physically and optically sufficient distance.

As shown in FIG. 2, grooves 12a and lands 12b are alternately formed on the surface of the transparent intermediate layer 12. The grooves 12a and/or lands 12b formed on the surface of the transparent intermediate layer 12 serve as a guide track for the laser beam L when data are to be recorded in the L1 layer 30 or when data are to be reproduced from the L1 layer 30.

The depth of the groove 12a and the pitch of the grooves 12a can be set to be substantially the same as those of the grooves 11a formed on the surface of the support substrate 11.

It is preferable to form the transparent intermediate layer 12 so as to have a thickness of 5 μm to 50 μm and it is more preferable to form it so as to have a thickness of 10 μm to 40 μm.

The material for forming the transparent intermediate layer 12 is not particularly limited and an ultraviolet ray curable acrylic resin is preferably used for forming the transparent intermediate layer 12.

It is necessary for the transparent intermediate layer 12 to have sufficiently high light transmittance since the laser beam L passes through the transparent intermediate layer 12 when data are to be recorded in the L1 layer 30 and data recorded in the L1 layer 30 are to be reproduced.

The light transmission layer 13 serves to transmit the laser beam L and the light incident plane 13a is constituted by one of the surfaces thereof.

It is preferable to form the light transmission layer 13 so as to have a thickness of 30 μm to 200 μm.

The material for forming the light transmission layer 13 is not particularly limited and, similarly to the transparent intermediate layer 12, an ultraviolet ray curable acrylic resin is preferably used for forming the light transmission layer 13.

The light transmission layer 13 may be formed by adhering a sheet made of light transmittable resin to the surface of the L1 layer 30 using an adhesive agent.

It is necessary for the light transmission layer 13 to have sufficiently high light transmittance since the laser beam L passes through the transparent intermediate layer 13 when data are to be recorded and data are to be reproduced.

As shown in FIG. 2, the L1 layer 30 includes the second L1 recording film 33b and the first L1 recording film 33a and the first L1 recording film 33a contains Si as a primary component and the second L1 recording film 33b containing Cu as a primary component.

In order to lower the noise level of a reproduced signal and improve the storage reliability of the optical recording medium 10, it is preferable to add one or more elements selected from the group consisting of Al, Zn, Sn, Mg and Au to the second L1 recording film 33b.

Similarly, as shown in FIG. 2, the L0 layer 20 includes the second L0 recording film 23b and the first L0 recording film 23a and the first L0 recording film 23a contains Si as a primary component and the second L0 recording film 23b containing Cu as a primary component.

In order to lower the noise level of a reproduced signal and improve the storage reliability of the optical recording medium 10, it is preferable to add one or more elements selected from the group consisting of Al, Zn, Sn, Mg and Au to the second L0 recording film 23b.

FIG. 3 is a schematic enlarged cross-sectional view showing the optical recording medium 10 shown in FIG. 1 after the L1 layer 30 was irradiated with a laser beam L.

As shown in FIG. 3, when the L1 layer 30 of the optical recording medium 10 is irradiated with a laser beam L via a light incident plane 13a, Si contained in the first recording film 33a as a primary component and Cu contained in the second recording film 33b as a primary component are quickly fused or diffused and a region M where Si and Cu are mixed is formed, thereby forming a record mark M.

As shown in FIG. 3, when Si contained in the first L1 recording film 33a as a primary component and Cu contained in the second L1 recording film 33b as a primary component are mixed to form a record mark M, the reflection coefficient of a region where the record mark has been formed greatly changes. Therefore, since the reflection coefficient of the region where the record mark is formed is greatly different from that of the region of the L1 layer 30 surrounding the region where the record mark M is formed, it is possible to obtain a high reproduced signal (C/N ratio) by reproducing data recorded in the L1 layer 30.

FIG. 4 is a schematic enlarged cross-sectional view showing the optical recording medium shown in FIG. 1 after an L0 layer was irradiated with a laser beam.

When the L0 layer 20 of the optical recording medium 10 is irradiated with a laser beam L via a light incident plane 13a, as shown in FIG. 4, Si contained in the first L0 recording film 23a as a primary component and Cu contained in the second L0 recording film 23b as a primary component are quickly fused or diffused and a region M where Si and Cu are mixed is formed, thereby forming a record mark M.

As shown in FIG. 4, when Si contained in the first L0 recording film 23a as a primary component and Cu contained in the second L0 recording film 23b as a primary component are mixed to form a record mark M, the reflection coefficient of a region where the record mark has been formed greatly changes. Therefore, since the reflection coefficient of the region where the record mark is formed is greatly different from that of the region of the L0 layer 20 surrounding the region where the record mark M is formed, it is possible to obtain a high reproduced signal (C/N ratio) by reproducing data recorded in the L0 layer 20.

Since the laser beam L passes through the L1 layer 30 when data are recorded in the L0 layer 20 and when data are reproduced from the L0 layer 20, if the difference in light transmittances between a region of the L1 layer 30 where a record mark M is formed and a blank region of the L1 layer 30 where no record mark M is formed is great, when data are recorded in the L0 layer 20, the amount of the laser beam L-projected onto the L0 layer 20 greatly changes depending upon whether the region of the L1 layer 30 through which the laser beam L passes is a region where a record mark is formed or a blank region and when data are reproduced from the L0 layer 20, the amount of the laser beam L reflected from the L0 layer 20, transmitting through the L1 layer 30 and detected greatly change depending upon whether the region of the L1 layer 30 through which the laser beam L passes is a region where a record mark is formed or a blank region. As a result, the recording characteristics of the L0 layer 20 and the amplitude of a signal reproduced from the L0 layer 20 change greatly depending upon whether the region of the L1 layer 30 through which the laser beam L passes is a region where a record mark M is formed or a blank region.

In particular, when data recorded in the L0 layer 20 are reproduced, if the region of the L1 layer 30 through which the laser beam L passes contains a boundary between a region where a record mark M is formed and a blank region, since the distribution of the reflection coefficient is not uniform at the spot of the laser beam L, data recorded in the L0 layer 20 cannot be reproduced in a desired manner.

In a study done by the inventors of the present invention, it was found that in order to record data in the L0 layer 20 and reproduce data from the L0 layer 20, it is necessary for the difference in light transmittances between a region of the L1 layer 30 where a record mark M is formed and a blank region of the L1 layer 30 to be equal to or lower than 4% and it is preferable for the difference to be equal to or lower than 2%.

The inventors of the present invention further found that the difference in light transmittances for a laser beam having a wavelength of 380 nm to 450 nm between the region of a record mark M formed by mixing Si and Cu and a blank region of the L1 layer 30 formed by laminating the first L1 recording film 33a containing Si as a primary component and the second L1 recording film 33b containing Cu as primary component is equal to or lower than 4% and the difference in light transmittances for a laser beam having a wavelength of about 405 nm between a region of the L1 layer 30 where a record mark M is formed and a blank region of the L1 layer 30 is equal to or lower than 1%.

In this embodiment the first L1 recording film 33a of the L1 layer 30 contains Si as primary component and the second L1 recording film 33b of the L1 layer 30 contains Cu as primary component so that when laser beam L is projected thereonto via the light incident plane 13a, Si contained in the first L1 recording film 33a as a primary component and Cu contained in the second L1 recording film 33b as a primary component are mixed with each other, thereby forming a record mark M. It is therefore possible to record data in the L0 layer 20 and reproduce data from the L0 layer 20 in a desired manner by projecting a laser beam L onto the L0 layer 20 via the L1 layer 30.

Since the laser beam L passes through the L1 layer 30 when data are to be recorded in the L0 layer 20 and data recorded in the L0 layer 20 are to be reproduced, it is necessary for the L1 layer 30 to have a high light transmittance and it is therefore preferable to form the L1 layer 30 so as to be thinner than the L0 layer 20.

Concretely, it is preferable to form the first L0 recording film 23a and the second L0 recording film 23b so that the total thickness thereof is 2 nm to 40 nm and form the first L1 recording film 33a and the second L1 recording film 33b so that the total thickness thereof is 2 nm to 15 nm.

In the case where the total thickness of the first L0 recording film 23a and second L0 recording film 23b and the total thickness of the first L1 recording film 33a and second L1 recording film 33b are both thinner than 2 nm, the change in reflection coefficient between before and after irradiation with the laser beam L is small so that a reproduced signal having high strength (C/N ratio) cannot be obtained.

On the other hand, when the total thickness of the first L1 recording film 33a and the second L1 recording film 33b exceeds 15 nm, the light transmittance of the L1 layer 30 is lowered and the recording characteristic and the reproducing characteristic of the L0 information recording layer 20 are degraded.

Further, when total thickness of the first L0 recording film 23a and the second L0 recording film 23b exceeds 40 nm, the recording sensitivity of the L0 layer 20 is degraded.

Furthermore, in order to increase the change in reflection coefficient between before and after irradiation with the laser beam L, it is preferable to define the ratio of the thickness of the first L0 recording film 23a included in the L0 information recording layer 23 to the thickness of the second L0 recording film 23b (thickness of the first L0 recording film 23a/thickness of the second L0 recording film 23b) and the ratio of the thickness of the first L1 recording film 33a included in the L1 information recording layer 33 to the thickness of the second L1 recording film 33b (thickness of the first L1 recording film 33a/thickness of the second L1 recording film 33b) to be from 0.2 to 5.0.

The third dielectric film 24 and the fourth dielectric film 22 serve as protective layers for protecting the first L0 recording film 23a and the second L0 recording film 23b and the first dielectric film 34 and the second dielectric film 32 serve as protective layers for protecting the first L1 recording film 33a and the second L1 recording film 33b. As a result, degradation of data recorded in the L0 layer 20 can be prevented over a long period by the third dielectric film 24 and the fourth dielectric film 22 and degradation of data recorded in the L1 layer 30 can be prevented over a long period by the first dielectric film 34 and the second dielectric film 32.

The fourth dielectric film 22, the third dielectric film 24, the second dielectric film 32 and the first dielectric film 34 also serve to increase the difference in optical properties between before and after irradiation with the laser beam L and it is therefore preferable to form the fourth dielectric film 22, the third dielectric film 24, the second dielectric film 32 and the first dielectric film 34 of a material having a high refractive index n.

On the other hand, when a laser beam L is projected, the recording sensitivity of the optical recording medium 10 is lowered if a large amount of the laser beam L is absorbed in the fourth dielectric film 22, the third dielectric film 24, the second dielectric film 32 and the first dielectric film 34. It is therefore preferable to form the fourth dielectric film 22, the third dielectric film 24, the second dielectric film 32 and the first dielectric film 34 of a material having a low extinction coefficient k.

Further, in this embodiment, since the L1 layer 30 includes no reflective film and the heat radiation characteristic of the L1 layer 30 is lower than that of the L0 layer 20, it is preferable to select the material for forming the second dielectric film 32 and the first dielectric film 34 with consideration to the heat radiation characteristic of the L1 layer 30.

Therefore, in this embodiment, each of the fourth dielectric film 22 and the third dielectric film 24 included in the L0 layer 20 is formed of the mixture of ZnS and $SiO_2$ (mole ratio: 80:20) which can form a film at a high film forming rate with high productivity and has a relatively high refractive index n and a relatively low extinction coefficient k with respect to a blue laser beam having a wavelength $\lambda$ of 380 nm to 450 nm.

To the contrary, the first dielectric film 34 included in the L1 layer 30 is formed so as to contain $Ta_2O_5$ or $TiO_2$ as a primary component and nitrogen as an additive and the second dielectric film 32 is formed of the mixture of ZnS and $SiO_2$ (mole ratio: 80:20). The first dielectric film 34 containing $Ta_2O_5$ or $TiO_2$ as a primary component and nitrogen as an additive has a higher thermal conductivity than those of the fourth dielectric film 22, the third dielectric film 24 and the second dielectric film 32 formed of the mixture of ZnS and $SiO_2$ (mole ratio: 80:20).

Since the refractive index n and the extinction coefficient k of $Ta_2O_5$ or $TiO_2$ greatly depend on the wavelength of the incident light, in the case where the dielectric film is formed of $Ta_2O_5$ or $TiO_2$, the refractive index n of the dielectric film becomes low or the extinction coefficient k of the dielectric film becomes high depending upon the wavelength of the laser beam used for recording and reproducing data, thereby degrading optical characteristics of the optical recording medium and, in particular, if a dielectric film is formed of an oxide in a next-generation type optical recording medium in which data are recorded and reproduced using a laser beam in the blue wavelength band, it will be impossible to obtain excellent optical characteristics.

However, a study carried out by the inventors of the present invention revealed that it is possible to vary the dependency of the refractive index n and the extinction coefficient k on the wavelength of the laser beam by adding nitrogen to a dielectric film containing an oxide as a primary component and that it is possible to form a dielectric film having a sufficiently high refractive index n and a sufficiently low extinction coefficient k with respect to a laser beam of desired wavelength by controlling the amount of nitrogen added to the dielectric film.

More specifically, it was found that the difference (n0–n) between the refractive index n0 of a dielectric film containing $Ta_2O_5$ or $TiO_2$ as a primary component and no nitrogen as an additive and the refractive index n of a dielectric film containing $Ta_2O_5$ or $TiO_2$ as a primary component and nitrogen as an additive becomes smaller as the wavelength of a laser beam L used for recording and reproducing data is shorter and the difference (k0–k) between the extinction coefficient k0 of a dielectric film containing $Ta_2O_5$ or $TiO_2$ as a primary component and no nitrogen as an additive and the extinction coefficient k of a dielectric film containing $Ta_2O_5$ or $TiO_2$ as a primary component and nitrogen as an additive becomes larger as the wavelength of a laser beam L used for recording and reproducing data is shorter. Particularly, it was found that even in the case where a laser beam L in the blue wavelength band, namely, a laser beam having a wavelength λ of 380 nm to 450 nm, is used for recording and reproducing data, it is possible to set the refractive index n and the extinction coefficient k of a dielectric film by selecting the amount of nitrogen added to the dielectric film so that the refractive index n of the dielectric film is larger than n0 and the extinction coefficient k thereof is smaller than k0.

A further study carried out by the inventors of the present invention revealed that the refractive index n0 of a dielectric film containing $Ta_2O_5$ as a primary component but no nitrogen as an additive greatly decreases as the wavelength of the laser beam L becomes shorter, while the refractive index n of a dielectric film containing $Ta_2O_5$ as a primary component and a prescribed amount of nitrogen as an additive greatly increases as the wavelength of the laser beam L becomes shorter, and that the extinction coefficient k of a dielectric film containing $Ta_2O_5$ as a primary component and a prescribed amount of nitrogen as an additive is smaller than the extinction coefficient k0 of a dielectric film containing $Ta_2O_5$ as a primary component but no nitrogen as an additive and becomes smaller as the wavelength of the laser beam L becomes shorter. It was further found by the inventors that the refractive index n0 of a dielectric film containing $TiO_2$ as a primary component but no nitrogen as an additive stays almost constant even if the wavelength of the laser beam L becomes shorter, while the refractive index n of a dielectric film containing $TiO_2$ as a primary component and a predetermined amount of nitrogen as an additive increases as the wavelength of the laser beam L becomes shorter, and that the extinction coefficient k of a dielectric film containing $TiO_2$ as a primary component and a prescribed amount of nitrogen as an additive is smaller than the extinction coefficient k0 of a dielectric film containing $TiO_2$ as a primary component but no nitrogen as an additive and becomes smaller as the wavelength of the laser beam L becomes shorter.

Therefore, in this embodiment, the amount of nitrogen added to the first dielectric film 34 is determined so that the refractive index n of the first dielectric film 34 is sufficiently high and the extinction coefficient k thereof is sufficiently low when a laser beam L having a wavelength of 380 nm to 450 nm is used for recording and reproducing data.

In this manner, in this embodiment, since the first dielectric film 34 located closer to the light incidence plane 13*a* among the two dielectric films included in the L1 layer 30 contains $Ta_2O_5$ or $TiO_2$ as a primary component and nitrogen as an additive, the heat radiation characteristic of the L1 layer 30 can be sufficiently improved and, therefore, if the second dielectric film 32 is formed so as to contain $Ta_2O_5$ or $TiO_2$ as a primary component and nitrogen as an additive, the heat radiation characteristic of the L1 layer 30 becomes too high, thereby posing a risk of lowering the recording sensitivity of the L1 layer 30. Accordingly, the second dielectric film 32 included in the L1 layer 30 is formed of the mixture of ZnS and $SiO_2$ (mole ratio: 80:20) similarly to the fourth dielectric film 22 and the third dielectric film 24 included in the L0 layer 20.

The thickness of each of the first dielectric film 22, the second dielectric film 24, the third dielectric film 32 and the fourth dielectric film 34 is not particularly limited and it preferably has a thickness of 1 nm to 150 nm. In the case where the thickness of each of the first dielectric film 22, the second dielectric film 24, the third dielectric film 32 and the fourth dielectric film 34 is thinner than 1 nm, each of the first dielectric film 22, the second dielectric film 24, the third dielectric film 32 and the fourth dielectric film 34 does not sufficiently serve as a protective layer. On the other hand, in the case where the thickness of each of the first dielectric film 22, the second dielectric film 24, the third dielectric film 32 and the fourth dielectric film 34 exceeds 150 nm, a long time is required for forming it, thereby lowering the productivity of the optical recording medium 10 and there is some risk of cracking the first L0 recording film 23*a* and the second L0 recording film 23*b* of the L0 layer 20 and the first L1 recording film 33*a* and the second recording film 33*b* of the L1 layer 30 due to internal stress.

The first dielectric film 22, the second dielectric film 24, the third dielectric film 32 and the fourth dielectric film 34 may have a single-layered structure or may have a multi-layered structure including a plurality of dielectric films. In the case of forming the fourth dielectric film 34 so as to have a multi-layered structure including a plurality of dielectric films, it is preferable for all of the dielectric films to contain $Ta_2O_5$ or $TiO_2$ as a primary component and nitrogen as an additive but it is also possible for only some of the dielectric films constituting the first dielectric film 34 to contain $Ta_2O_5$ or $TiO_2$ as a primary component and nitrogen as an additive.

The reflective film 21 serves to reflect the laser beam L entering through the light incidence plane 13*a* so as to emit it from the light transmission layer 13 and radiate heat generated in the first recording film 23*a* and the second recording film 23*b*.

The thickness of the reflective film 21 is not particularly limited and the reflective film 21 is preferably formed so as to have a thickness of 20 nm to 200 nm. In the case where the reflective film 21 is thinner than 20 nm, it is difficult to radiate heat generated in the first recording film 23*a* and the second recording film 23*b* in a desired manner and, on the other hand, in the case where the thickness of the reflective film 21 exceeds 200 nm, a long time is required for forming it, thereby lowering the productivity of the optical recording medium 10 and there is some risk of cracking the reflective film 21 due to internal stress.

The material used to form the reflective film 21 is not particularly limited and the reflective film 21 can be formed of Mg, Al, Ti, Cr, Fe, Co, Ni, Cu, Zn, Ge, Ag, Pt, Au and the like. Among these materials, it is preferable to form the reflective film 21 of a metal material having a high reflection characteristic, such as Al, Au, Ag, Cu or alloy containing at least one of these metals, such as alloy of Al and Ti.

The optical recording medium 10 having the above-described configuration can, for example, be fabricated in the following manner.

FIGS. 5 to 8 show steps for manufacturing the optical recording medium 10.

Figure 5:
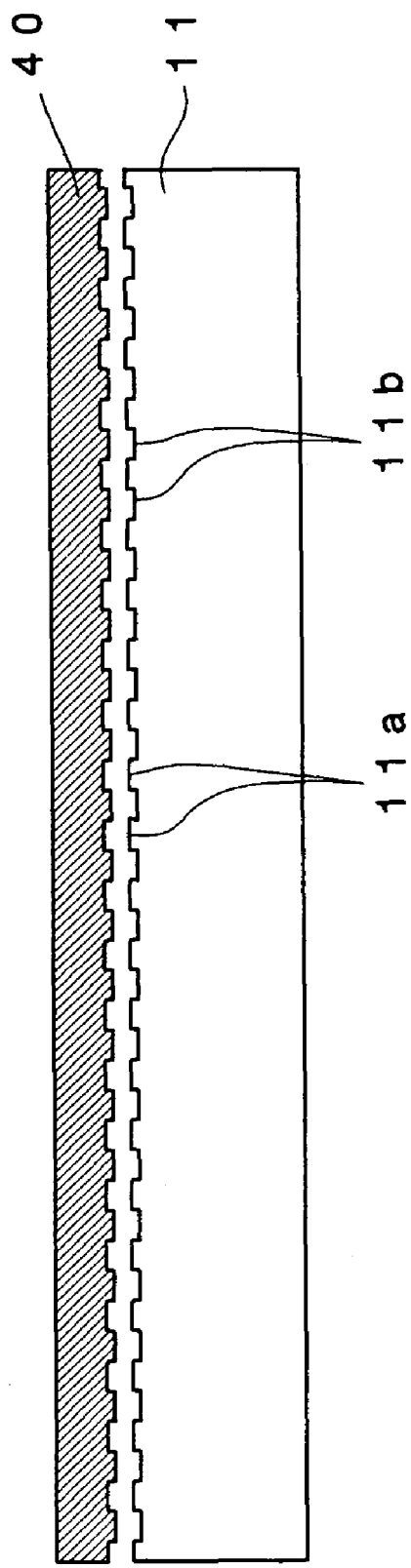
FIGS. 5 to 8 show steps for manufacturing an optical recording medium.

As shown in FIG. 5, the support substrate 11 having the groove 11a and the land 11b on the surface thereof is first fabricated by injection molding using a stamper 40.

Figure 6:
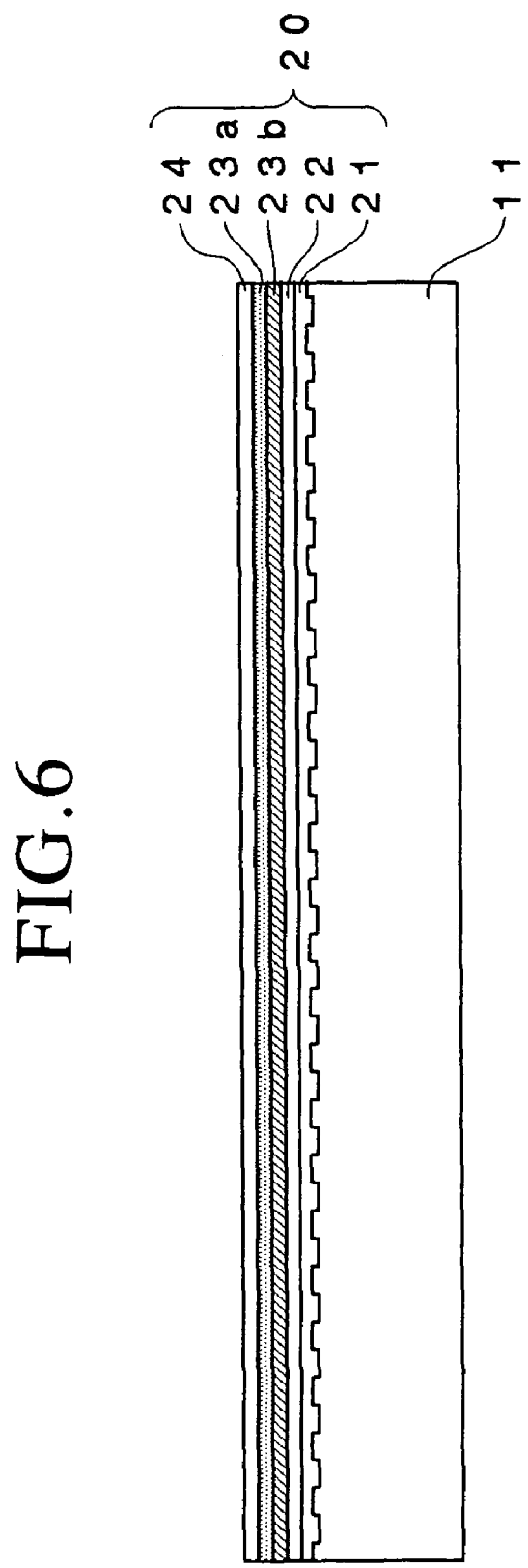

Then, as shown in FIG. 6, the reflective film 21, the fourth dielectric film 22, the second L0 recording film 23b, the first L0 recording film 23a and the third dielectric film 24 are sequentially formed using a gas phase growth process on the surface of the support substrate 11 formed with the groove 11a and the land 11b.

More specifically, as shown in FIG. 6, the reflective film 21 is further formed on the surface of the support substrate 11 formed with the groove 11a and the land 11b.

The reflective film 21 can be formed by a gas phase growth process using chemical species containing elements for forming the reflective film 21. Illustrative examples of the gas phase growth processes include vacuum deposition process, sputtering process and the like.

The fourth dielectric film 22 is then formed on surface of the reflective film 21. The fourth dielectric film 22 can be formed by a gas phase growth process using chemical species containing elements for forming the fourth dielectric film 22. Illustrative examples of the gas phase growth processes include vacuum deposition process, sputtering process and the like.

The second L0 recording film 23b is further formed on surface of the fourth dielectric film 22. The second L0 recording film 23b can be formed by a gas phase growth process using chemical species containing elements for forming the second L0 recording film 23b. Illustrative examples of the gas phase growth processes include vacuum deposition process, sputtering process and the like.

The first L0 recording film 23a is then formed on surface of the second L0 recording film 23b. The first L0 recording film 23a can be formed by a gas phase growth process using chemical species containing elements for forming the first L0 recording film 23a. Illustrative examples of the gas phase growth processes include vacuum deposition process, sputtering process and the like.

The third dielectric film 24 is further formed on surface of the first L0 recording film 23a. The third dielectric film 24 can be formed by a gas phase growth process using chemical species containing elements for forming the third dielectric film 24. Illustrative examples of the gas phase growth processes include vacuum deposition process, sputtering process and the like.

Figure 7:
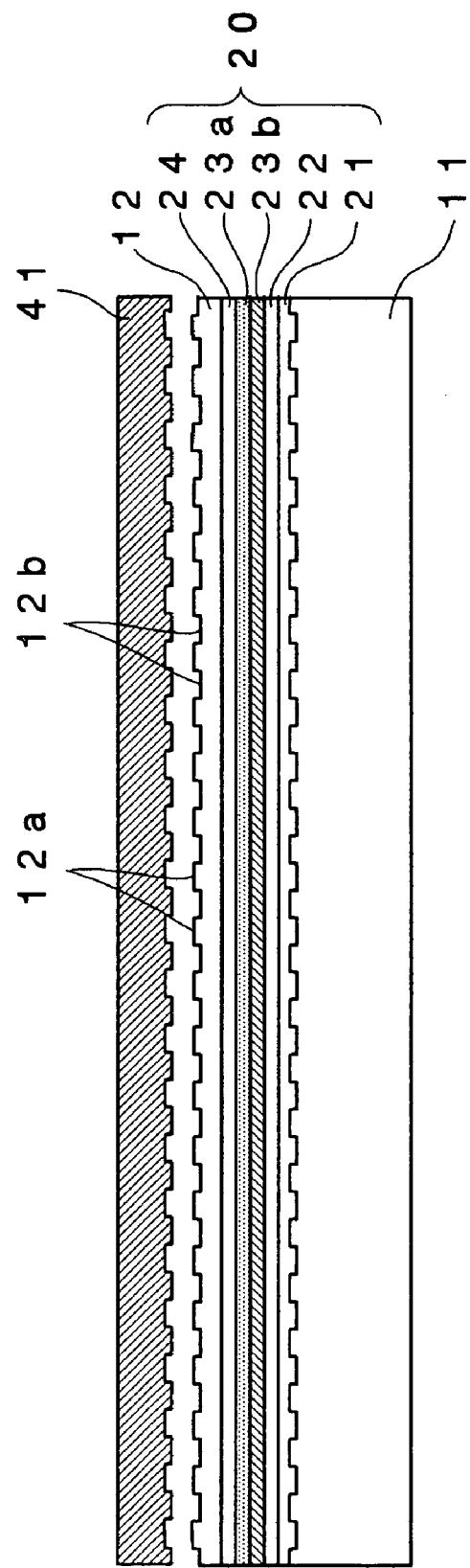

Further, as shown in FIG. 7, an ultraviolet ray curable resin is coated on the L1 layer 30 by a spin coating method to form a coating film and the surface of the coating film is irradiated with an ultraviolet ray via a stamper 41 while it is covered by the stamper 41, thereby forming the transparent intermediate layer 12 formed with grooves 12a and lands 12b on the surface thereof.

Figure 8:
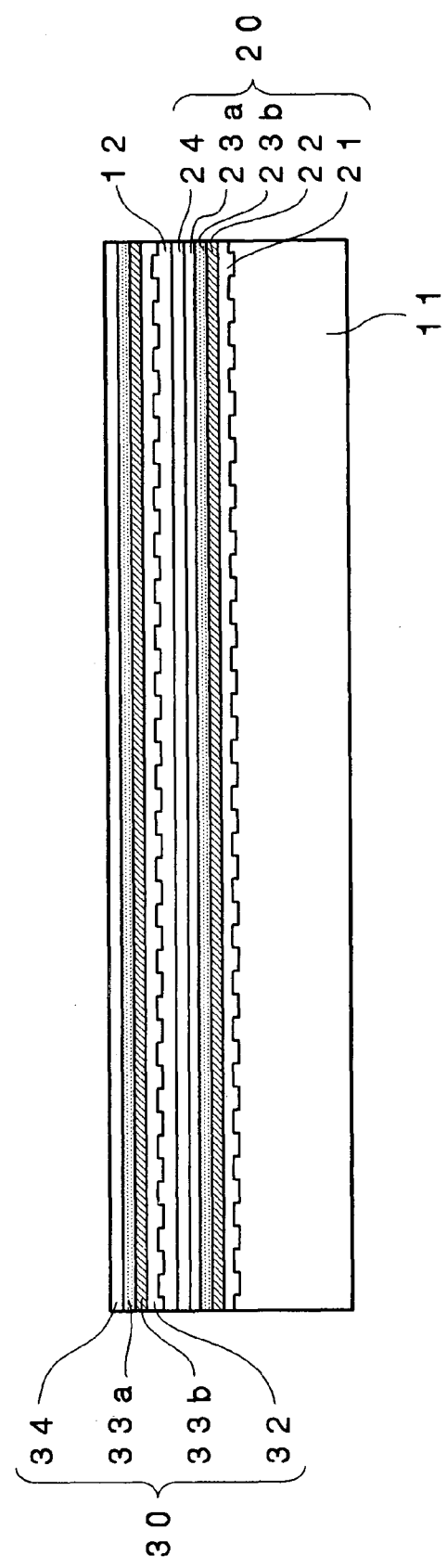

Then, as shown in FIG. 8, the second dielectric film 32, the second L1 recording film 33b, the first L1 recording film 33a and the first dielectric film 34 are sequentially formed using a gas phase growth process on the surface of the transparent intermediate layer 12 formed with grooves 12a and lands 12b.

More specifically, as shown in FIG. 8, the second dielectric film 32 is formed on the surface of the transparent intermediate layer 12 formed with grooves 12a and lands 12b. The second dielectric film 32 can be formed by a gas phase growth process using chemical species containing elements for forming the second dielectric film 32. Illustrative examples of the gas phase growth processes include vacuum deposition process, sputtering process and the like.

The second L1 recording film 33b is further formed on surface of the second dielectric film 32. The second L1 recording film 33b can be formed by a gas phase growth process using chemical species containing elements for forming the second L1 recording film 33b. Illustrative examples of the gas phase growth processes include vacuum deposition process, sputtering process and the like.

The first L1 recording film 33a is further formed on surface of the second L1 recording film 33b. The first L1 recording film 33a can be formed by a gas phase growth process using chemical species containing elements for forming the first L1 recording film 33a. Illustrative examples of the gas phase growth processes include vacuum deposition process, sputtering process and the like.

The first dielectric film 34 is then formed on surface of the first L1 recording film 33a.

In this embodiment, the first dielectric film 34 is formed by a sputtering process using a mixed gas of argon gas and nitrogen gas as sputtering gas and an oxide such as $Ta_2O_5$, $TiO_2$ or the like as a target. As a result, the first dielectric film 34 contains an oxide such as $Ta_2O_5$, or $TiO_2$ as a primary component and is added with nitrogen. The nitrogen content of the first dielectric film 34 is determined so that the first dielectric film 34 has a high refractive index n and a low extinction coefficient k and the nitrogen content of the first dielectric film 34 can be controlled by controlling the amount of nitrogen gas in the sputtering gas.

Finally, the light transmission layer 13 is formed on the first dielectric film 34. The light transmission layer 13 can be formed, for example, by applying an acrylic ultraviolet ray curable resin or epoxy ultraviolet ray curable resin adjusted to an appropriate viscosity onto the surface of the second dielectric layer 13 by spin coating to form a coating layer and irradiating the coating layer with ultraviolet rays to cure the coating layer.

This completes the fabrication of the optical recording medium 10.

When data are to be recorded in the thus constituted optical recording medium 10, the light incident plane 13a of the light transmission layer 13 is irradiated with a laser beam L whose power is modulated and the focus of the laser beam L is adjusted onto the first L0 recording film 23a and the second L0 recording film 23b included in the L0 layer 20 or the first L1 recording film 33a and the second L1 recording film 33b included in the L1 layer 30.

A laser beam L having a wavelength of 380 nm to 450 nm is preferably employed for recording data in the optical recording medium 10 and reproducing data from the optical recording medium 10 and in this embodiment, the laser beam L is condensed by an objective lens having a numerical aperture of 0.85 onto the first L0 recording film 23a and the second L0 recording film 23b included in the L0 layer 20 or the first L1 recording film 33a and the second L1 recording film 33b included in the L1 layer 30 via the light transmission layer 13.

When the laser beam L is focused onto the first L1 recording film 33a and the second L1 recording film 33b included in the L1 layer 30, Si contained in the first L1 recording film 33a as a primary component and Cu contained in the second L1 recording film 33b as a primary component are mixed with each other at a region irradiated with the laser beam L and, as shown in FIG. 3, a record mark M is formed.

At this time, heat generated by the laser beam L in the first L1 recording film 33a and the second L1 recording film 33b can be quickly radiated since the first L1 recording film 33a located close to the light incidence plane 13a contains $Ta_2O_5$ or $TiO_2$ as a primary component and nitrogen as an additive and has a high thermal conductivity and it is therefore possible to prevent the degradation of characteristics of signals obtained by reproducing data recorded in the L1 layer 30 caused by heat generated in the first L1 recording film 33a and the second L1 recording film 33b even though the L1 layer 30 includes no reflective film.

On the other hand, when the laser beam L is focused onto the first L0 recording film 23a and the second L0 recording film 23b included in the L0 layer 20, Si contained in the first L0 recording film 23a as a primary component and Cu contained in the second L0 recording film 23b as a primary component are mixed with each other at a region irradiated with the laser beam L and as shown in FIG. 4, a record mark M is formed.

At this time, since the laser beam L is projected onto the first L0 recording film 23a and the second L0 recording film 23b via the L1 layer 30, the recording sensitivity of the L0 layer 20 is lowered if a large amount of the laser beam L is absorbed in the first dielectric film 34 and the second dielectric film 32 included in the L1 layer 30. However, in this embodiment, since the first dielectric film 34 contains $Ta_2O_5$ or $TiO_2$ as a primary component and nitrogen as an additive and the amount of nitrogen added to the first dielectric film 32 is determined so that the extinction coefficient k thereof is sufficiently low when a laser beam L having a wavelength λ of 380 nm to 450 nm is used for recording and reproducing data, it is possible to effectively prevent the recording sensitivity of the L0 layer 20 from being lowered.

Further, since the difference in light transmittances for a laser beam L having a wavelength of 380 nm to 450 nm between the region of a record mark M formed by mixing Si contained in the first L1 recording film 33a as a primary component and Cu contained in the second L1 recording film 33b as a primary component and a blank region of the L1 layer 30 formed by laminating the first L1 recording film 33a containing Si as a primary component and the second L1 recording film 33b containing Cu as primary component is extremely low, it is possible to effectively prevent the recording characteristics of the L0 layer 20 from changing greatly depending upon whether the region of the L1 layer 30 through which the laser beam L passes is a region where a record mark is formed or a blank region and it is therefore possible to record data in the L0 layer 20 in a desired manner by projecting the laser beam L thereonto via the L1 layer 30.

On the other hand, in the case where data recorded in the L1 layer 30 of the optical recording medium 10 are to be reproduced, the light incident plane 13a of the light transmission layer 13 is irradiated with a laser beam L whose intensity is modulated and the laser beam L is focused onto the L1 layer 30 and the amount of the laser beam L reflected 25 from the L1 layer 30 is detected.

In this embodiment, since Si contained in the first L1 recording film 33a as a primary component and Cu contained in the second L1 recording film 33b as a primary component are mixed to form a record mark M and the reflection coefficient of the region where the record mark is formed is greatly different from that of the region of the L1 layer 30 surrounding the region where the record mark M is formed, in the case of reproducing data recorded in the L1 layer 30 of the optical recording medium 10, it is possible to obtain a high reproduced signal (C/N ratio) by reproducing data recorded in the L1 layer 30.

Further, in this embodiment, although the L1 layer 30 is provided with no reflective film so as to prevent the light transmittance thereof from being lowered, since the first dielectric layer 34 included in the L1 layer 30 contains $Ta_2O_5$ or $TiO_2$ as a primary component and nitrogen as an additive and has a high thermal conductivity and the amount of nitrogen added to the first dielectric film 32 is determined so that the refractive index n thereof is sufficiently high and the extinction coefficient k thereof is sufficiently low when a laser beam L having a wavelength λ of 380 nm to 450 nm is used for recording and reproducing data, it is possible to increase modulation, namely, the difference in reflection coefficients between a region of the L1 layer 30 where a record mark is formed and a region thereof where no record mark is formed.

On the other hand, in the case where data recorded in the L0 layer 20 of the optical recording medium 10 are to be reproduced, the light incident plane 13a of the light transmission layer 13 is irradiated with a laser beam L whose intensity is modulated and the laser beam L is focused onto the L0 layer 20 and the amount of the laser beam L reflected from the L0 layer 20 is detected.

In this embodiment, although the laser beam L is projected onto the L0 layer 20 via the L1 layer 30, since the difference in light transmittances for a laser beam L having a wavelength of 380 nm to 450 nm between the region of a record mark M formed by mixing Si contained in the first L1 recording film 33a as a primary component and Cu contained in the second L1 recording film 33b as a primary component and a blank region of the L1 layer 30 formed by laminating the first L1 recording film 33a containing Si as a primary component and the second L1 recording film 33b containing Cu as primary component is extremely low, it is possible to effectively prevent the amplitude of a signal reproduced from the L0 layer 20 from changing greatly depending upon whether the region of the L0 layer 20 through which the laser beam L is projected is a region where a record mark is formed or a blank region. Further, even when the region of the L1 layer 30 through which the laser beam L passes contains a boundary between a region where a record mark M is formed and a blank region, it is possible to effectively prevent the distribution of the reflection coefficient at the spot of the laser beam L from varying.

Furthermore, in this embodiment, since the laser beam L is projected onto the first L0 recording film 23a and the second L0 recording film 23b via the L1 layer 30, if a large amount of the laser beam L is absorbed in the first dielectric film 34 and the second dielectric film 32 included in the L1 layer 30, the amount of the laser beam L reflected by the L0 layer 20 and detected becomes lower. However, in this embodiment, since the first dielectric film 34 contains $Ta_2O_5$ or $TiO_2$ as a primary component and nitrogen as an additive and the amount of nitrogen added to the first dielectric film 32 is determined so that the extinction coefficient k thereof is sufficiently low when a laser beam L having a wavelength λ of 380 nm to 450 nm is used for recording and reproducing data, it is possible to sufficiently prevent the amount of the laser beam L reflected by the L0 layer 20 and detected from being lowered.

Figure 9:
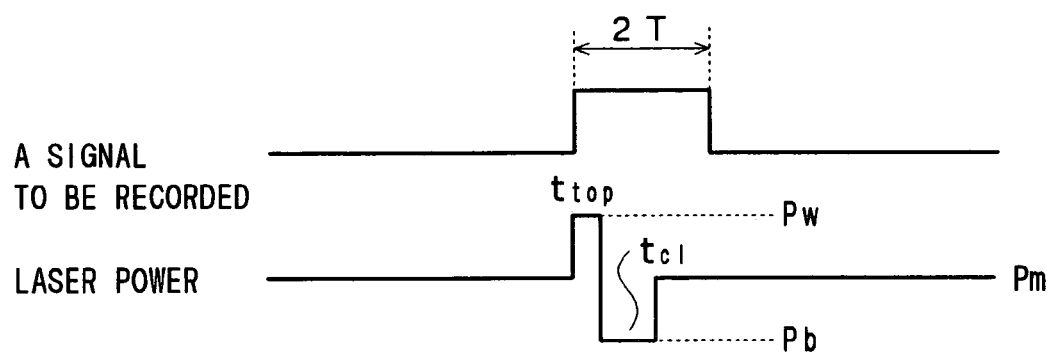
FIG. 9 is a diagram showing the waveform of a pulse pattern for modulating the power of a laser beam in the case of recording 2T signals in an L0 layer or an L1 layer of an optical recording medium.
Figure 10:
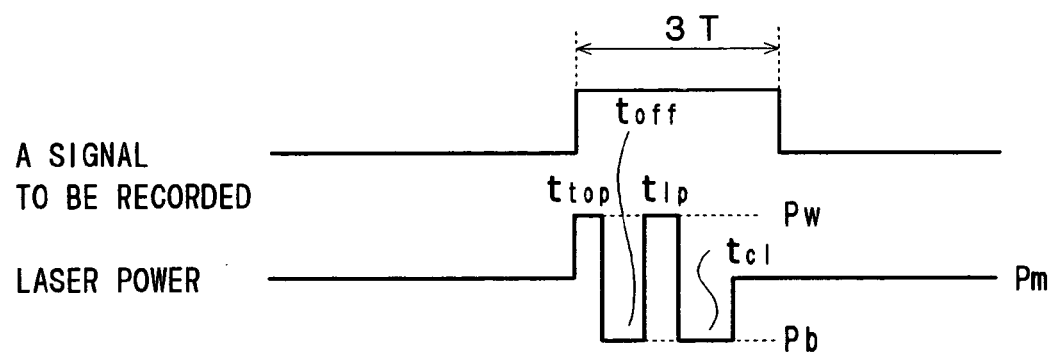
FIG. 10 is a diagram showing the waveform of a pulse pattern for modulating the power of a laser beam in the case of recording 3T signals in an L0 layer or an L1 layer of an optical recording medium.
Figure 11:
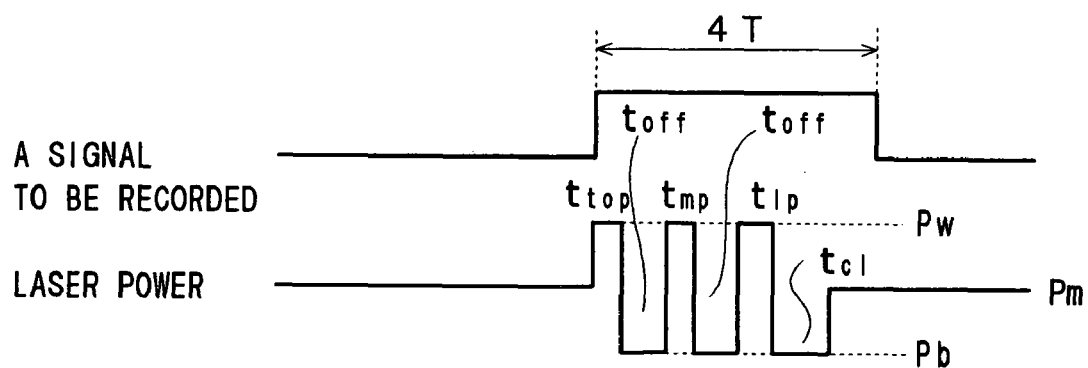
FIG. 11 is a diagram showing the waveform of a pulse pattern for modulating the power of a laser beam in the case of recording 4T signals in an L0 layer or an L1 layer of an optical recording medium.
Figure 12:
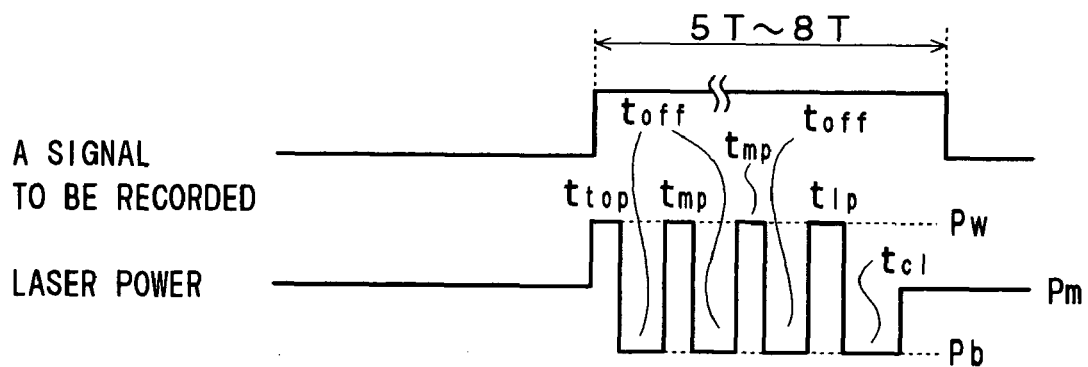
FIG. 12 is a diagram showing the waveform of a pulse pattern for modulating the power of a laser beam in the case of recording one among a 5T signal to an 8T signal in an L0 layer or an L1 layer of an optical recording medium.

Each of FIGS. 9 to 12 is a diagram showing the waveform of a pulse pattern for modulating the power of the laser beam L in the case of recording data in the L0 layer 20 or the L1 layer 30 of the optical recording medium 10, where FIG. 9 shows a pulse pattern used in the case of recording 2T signals, FIG. 10 shows a pulse pattern used in the case of recording 3T signals, FIG. 11 shows a pulse pattern used in the case of recording 4T signals and FIG. 12 shows random signals used in the case of recording one among a 5T signal to an 8T signal.

As shown in FIGS. 9 to 12, the power of the laser beam L is modulated between three levels, a recording power Pw, an intermediate power Pm and a ground power Pb where Pw>Pm>Pb.

The recording power Pw is set to such a high level that Si contained in the first L0 recording film 23a as a primary component and Cu contained in the second L0 recording film 23b as a primary component can be heated and mixed to form a record mark M when the laser beam L whose power is set to the recording power Pw is projected onto the L0 layer 20 and that Si contained in the first L1 recording film 33a as a primary component and Cu contained in the second L1 recording film 33b as a primary component can be heated and mixed to form a record mark M when the laser beam L whose power is set to the recording power Pw is projected onto the L1 layer 30. On the other hand, the intermediate power Pm and the ground power Pb are set to such low levels that Si contained in the first L0 recording film 23a as a primary component and Cu contained in the second L0 recording film 23b as a primary component cannot be substantially mixed when the laser beam L whose power is set to the intermediate power Pm or the ground power Pb is projected onto the L0 layer 20 and that Si contained in the first L1 recording film 33a as a primary component and Cu contained in the second L1 recording film 33b as a primary component cannot be substantially mixed when the laser beam L whose power is set to the intermediate power Pm or the ground power Pb is projected onto the L1 layer 30. In particular, the ground power Pb is set to such an extremely low level that regions of the first L0 recording film 23a and the second L0 recording film 23b or the first L1 recording film 33a and the second L1 recording film 33b heated by irradiation with the laser beam L whose power is set to the recording power Pw can be cooled by irradiation with the laser beam L whose power is set to the ground power Pb.

As shown in FIG. 9, in the case of recording 2T signals in the optical recording medium 10, the power of the laser beam L is modulated so that it is increased from the intermediate power Pm to the recording power Pw, decreased from the recording power Pw to the ground power Pb after passage of a predetermined time period $t_{top}$, and increased from the ground power Pb to the intermediate power Pm after passage of a predetermined time period $t_{cl}$.

On the other hand, as shown in FIG. 10, in the case of recording 3T signals in the optical recording medium 10, the power of the laser beam L is modulated so that it is increased from the intermediate power Pm to the recording power Pw, decreased from the recording power Pw to the ground power Pb after passage of a predetermined time period $t_{top}$, increased from the ground power Pb to the recording power Pw after passage of a predetermined time period $t_{off}$, decreased from the recording power Pw to the ground power Pb after passage of a predetermined time period $t_{lp}$, and increased from the ground power Pb to the intermediate power Pm after passage of a predetermined time period $t_{cl}$.

Further, as shown in FIG. 11, in the case of recording 4T signals in the optical recording medium 10, the power of the laser beam L is modulated so that it is increased from the intermediate power Pm to the recording power Pw, decreased from the recording power Pw to the ground power Pb after passage of a predetermined time period $t_{top}$, increased from the ground power Pb to the recording power Pw after passage of a predetermined time period $t_{off}$, decreased from the recording power Pw to the ground power Pb after passage of a predetermined time period $t_{mp}$, increased from the ground power Pb to the recording power Pw after passage of a predetermined time period $t_{off}$, decreased from the recording power Pw to the ground power Pb after passage of a predetermined time period $t_{lp}$, and increased from the ground power Pb to the intermediate power Pm after passage of a predetermined time period $t_{cl}$.

Moreover, as shown in FIG. 12, in the case of recording one among a 5T signal to a 8T signal in the optical recording medium 10, the power of the laser beam L is modulated so that it is increased from the intermediate power Pm to the recording power Pw, held at the recording power Pw during the time period $t_{top}$, the time periods $t_{mp}$ and the time period $t_{lp}$, held at the ground power Pb during the time periods $t_{off}$ and the time period $t_{cl}$ and increased from the ground power Pb to the intermediate power Pm after passage of the time period $t_{cl}$.

In the case where data are recorded in the optical recording medium 10 by modulating the power of a laser beam L using a pulse pattern shown in FIGS. 9 to 12, since the power of the laser beam L is modulated to the ground power Pb immediately after being set to the recording power Pw, even when data are recorded in the L1 layer 30 provided with no reflective film, it is possible to prevent excessive heat from being accumulated in the L1 layer 30 and it is therefore possible to prevent the degradation of characteristics of signals obtained by reproducing data recorded in the L1 layer 30 caused by heat generated in the first L1 recording film 33a and the second L1 recording film 33b even though the L1 layer 30 includes no reflective film.

According to this embodiment, since the first L1 recording film 33a located close to the light incidence plane 13a contains $Ta_2O_5$ or $TiO_2$ as a primary component and nitrogen as an additive and has a high thermal conductivity, in the case of recording data in the L1 layer 30, heat generated by the laser beam L in the first L1 recording film 33a and the second L1 recording film 33b can be quickly radiated and it is therefore possible to prevent the degradation of characteristics of signals obtained by reproducing data recorded in the L1 layer 30 caused by heat generated in the first L1 recording film 33a and the second L1 recording film 33b even though the L1 layer 30 includes no reflective film.

Further, in the case of recording data in the L0 layer 20, since the laser beam L is projected onto the first L0 recording film 23a and the second L0 recording film 23b via the L1 layer 30, the recording sensitivity of the L0 layer 20 is lowered if a large amount of the laser beam L is absorbed in the first dielectric film 34 and the second dielectric film 32 included in the L1 layer 30. However, according to this embodiment, since the first dielectric film 34 contains $Ta_2O_5$ or $TiO_2$ as a primary component and nitrogen as an additive and the amount of nitrogen added to the first dielectric film 32 is determined so that the extinction coefficient k thereof is sufficiently low when a laser beam L having a wavelength λ of 380 nm to 450 nm is used for recording and reproducing data, it is possible to effectively prevent the recording sensitivity of the L0 layer 20 from being lowered.

Furthermore, according to this embodiment, since the difference in light transmittances for a laser beam L having a wavelength of 380 nm to 450 nm between the region of a record mark M formed by mixing Si contained in the first L1 recording film 33a as a primary component and Cu contained in the second L1 recording film 33b as a primary component and a blank region of the L1 layer 30 formed by laminating the first L1 recording film 33a containing Si as a primary component and the second L1 recording film 33b containing Cu as primary component is extremely low, it is possible to effectively prevent the recording characteristics of the L0 layer 20 from changing greatly depending upon whether the region of the L1 layer 30 through which the laser beam L passes is a region where a record mark is formed or a blank region and it is therefore possible to record data in the L0 layer 20 in a desired manner by projecting the laser beam L thereonto via the L1 layer 30.

Moreover, according to this embodiment, since Si contained in the first L1 recording film 33a as a primary component and Cu contained in the second L1 recording film 33b as a primary component are mixed to form a record mark M and the reflection coefficient of the region where the record mark is formed is greatly different from that of the region of the L1 layer 30 surrounding the region where the record mark M is formed, in the case of reproducing data recorded in the L1 layer 30 of the optical recording medium 10, it is possible to obtain a high reproduced signal (C/N ratio) by reproducing data recorded in the L1 layer 30.

Further, according to this embodiment, although the L1 layer 30 is provided with no reflective film so as to prevent the light transmittance thereof from being lowered, since the first dielectric layer 34 included in the L1 layer 30 contains $Ta_2O_5$ or $TiO_2$ as a primary component and nitrogen as an additive and has a high thermal conductivity and the amount of nitrogen added to the first dielectric film 32 is determined so that the refractive index n thereof is sufficiently high and the extinction coefficient k thereof is sufficiently low when a laser beam L having a wavelength λ of 380 nm to 450 nm is used for recording and reproducing data, it is possible to increase modulation, namely, the difference in reflection coefficients between a region of the L1 layer 30 where a record mark is formed and a region thereof where no record mark is formed.

Furthermore, in the case of reproducing data recorded in the L0 layer 20 of the optical recording medium 10, although the laser beam L is projected onto the L0 layer 20 via the L1 layer 30, according to this embodiment, since the difference in light transmittances for a laser beam L having a wavelength of 380 nm to 450 nm between the region of a record mark M formed by mixing Si contained in the first L1 recording film 33a as a primary component and Cu contained in the second L1 recording film 33b as a primary component and a blank region of the L1 layer 30 formed by laminating the first L1 recording film 33a containing Si as a primary component and the second L1 recording film 33b containing Cu as primary component is extremely low, it is possible to effectively prevent the amplitude of a signal reproduced from the L0 layer 20 from changing greatly depending upon whether the region of the L0 layer 20 through which the laser beam L is projected is a region where a record mark is formed or a blank region. Further, even when the region of the L1 layer 30 through which the laser beam L passes contains a boundary between a region where a record mark M is formed and a blank region, it is possible to effectively prevent the distribution of the reflection coefficient at the spot of the laser beam L from varying.

Moreover, in the case of reproducing data recorded in the L0 layer 20 of the optical recording medium 10, since the laser beam L is projected onto the first L0 recording film 23a and the second L0 recording film 23b via the L1 layer 30, the amount of the laser beam L reflected by the L0 layer 20 and detected becomes lower if a large amount of the laser beam L is absorbed in the first dielectric film 34 and the second dielectric film 32 included in the L1 layer 30. However, according to this embodiment, since the first dielectric film 34 contains $Ta_2O_5$ or $TiO_2$ as a primary component and nitrogen as an additive and the amount of nitrogen added to the first dielectric film 32 is determined so that the extinction coefficient k thereof is sufficiently low when a laser beam L having a wavelength λ of 380 nm to 450 nm is used for recording and reproducing data, it is possible to sufficiently prevent the amount of the laser beam L reflected by the L0 layer 20 and detected from being lowered.

WORKING EXAMPLES AND COMPARATIVE EXAMPLES

Hereinafter, working examples will be set out in order to further clarify the advantages of the present invention.

Working Example 1

A disk-like polycarbonate substrate having a thickness of 1.1 mm and a diameter of 120 mm was first fabricated using an injection molding process.

The thus fabricated polycarbonate substrate was then set on a sputtering apparatus and a sputtering process was performed at a power of 800 W using a $Ta_2O_5$ target, thereby forming a dielectric layer having a thickness of 30 nm and containing $Ta_2O_5$ as a primary component on the surface of the polycarbonate substrate.

A mixed gas of argon gas and nitrogen gas was employed as a sputtering gas and samples #1-1 to #1-6 were fabricated to give their dielectric layers different nitrogen contents from each other by varying the flow rate of nitrogen from 0 to 35 SCCM.

The amount of nitrogen contained in the dielectric layer of each of the samples #1-1 to #1-6 was measured and the relationship between the composition of the mixed gas used as the sputtering gas and the amounts of nitrogen added to the dielectric layers of the samples #1-1 to #1-6 was determined.

The results of the measurement are shown in Table 1.

The amount of nitrogen added to each of the dielectric layer was obtained by multiplying the peak areas of the 4f peak of tantalum (peak position: about 28.2 to 37.4 eV), the is peak of oxygen (peak position: about 523 to 543 eV) and the is peak of nitrogen (peak position: about 390 to 410 eV) measured by the ESCA (Electron Spectroscopy for Chemical Analysis), namely, XPS (X-ray photoelectron spectroscopy) by the corresponding sensitivity factors of the peaks, namely, 0.596 of that of the 4f peak of tantalum, 2.994 of that of the 1 s peak of oxygen and 4.505 of that of the 1 s peak of nitrogen.

TABLE 1

|  | Flow rate of Ar gas (sccm) | Flow rate of $N_2$ gas (sccm) | Amount of Nitrogen (atomic %) |
|---|---|---|---|
| Sample #1-1 | 55 | 0 | 0 |
| Sample #1-2 | 50 | 5 | 3.3 |
| Sample #1-3 | 45 | 10 | 6.1 |
| Sample #1-4 | 40 | 15 | 8.4 |
| Sample #1-5 | 30 | 25 | 11.3 |
| Sample #1-6 | 20 | 35 | 12.1 |

Then, a laser beam having a wavelength of 405 nm and a laser beam having a wavelength of 680 nm were projected onto each of the samples #1-1 to #1-6, whereby the refractive index n and the extinction coefficient k thereof were measured and the relationship between the amount (atomic %) of nitrogen added to the dielectric layers and the refractive index n of the dielectric layer and the relationship between the amount (atomic %) of nitrogen added to the dielectric layers and the extinction coefficient k of the dielectric layer were obtained.

Figure 13:
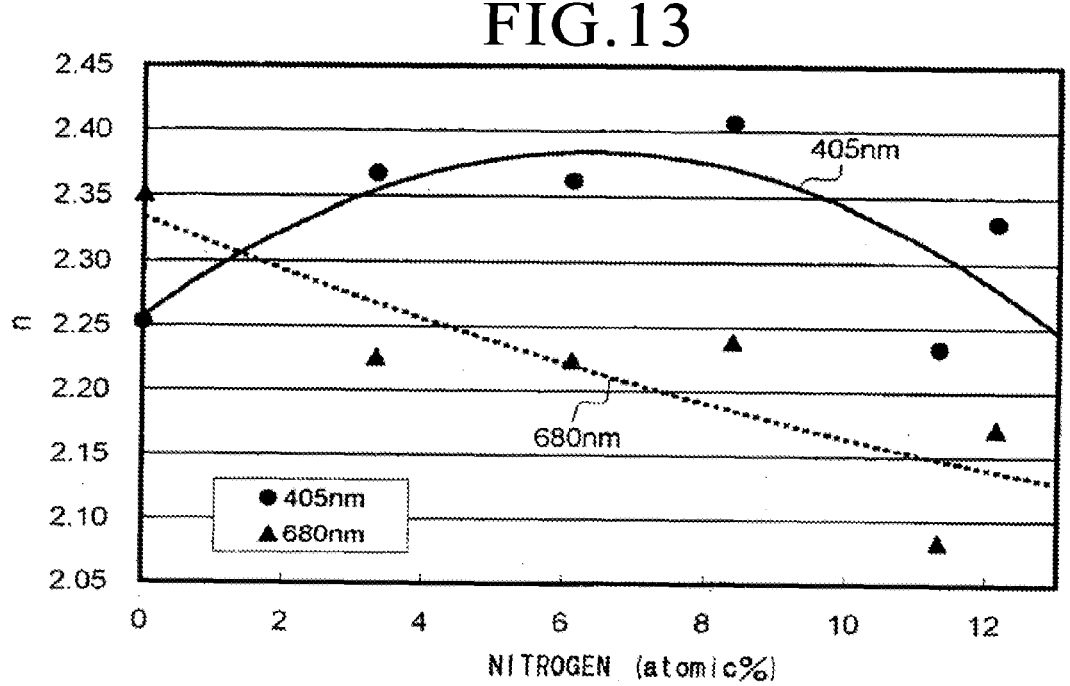
FIG. 13 is a graph showing the relationship between the amount of nitrogen added to a dielectric layer and the refractive index n of the dielectric layer measured in Working Example 1.
Figure 14:
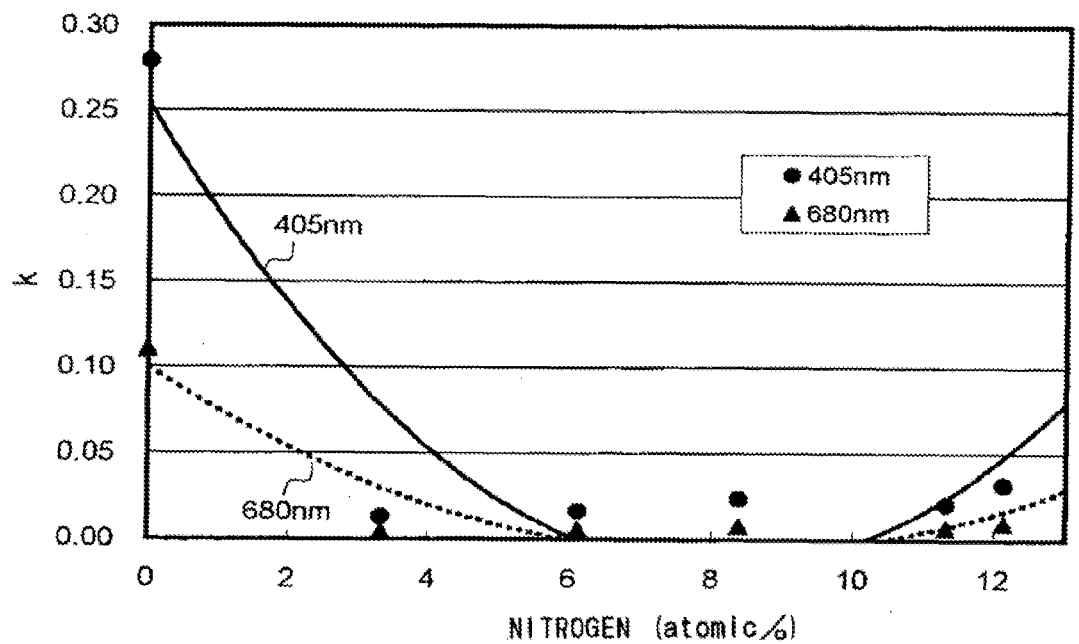
FIG. 14 is a graph showing the relationship between the amount of nitrogen added to a dielectric layer and the extinction coefficient k of the dielectric layer measured in Working Example 1.

The thus obtained relationship between the amount (atomic %) of nitrogen added to the dielectric layers and the refractive index n of the dielectric layer is shown in FIG. 13 and the relationship between the amount (atomic %) of nitrogen added to the dielectric layers and the extinction coefficient k of the dielectric layer is shown in FIG. 14.

As shown in FIG. 13, it was found that the refractive index n of the dielectric layer with respect to the laser beam having a wavelength of 680 nm decreased as the amount (atomic %) of nitrogen added to the dielectric layer containing $Ta_2O_5$ as a primary component was increased.

To the contrary, as shown in FIG. 13, it was found that the refractive index n of the dielectric layer with respect to the laser beam having a wavelength of 405 nm increased as the amount (atomic %) of nitrogen added to the dielectric layer containing $Ta_2O_5$ as a primary component was increased but when the amount of the nitrogen added to the dielectric layer exceeded about 6 atomic %, it decreased as the amount (atomic %) of nitrogen added to the dielectric layer containing $Ta_2O_5$ as a primary component was increased.

On the other hand, as shown in FIG. 14, it was found that when nitrogen was added to the dielectric layer containing $Ta_2O_5$ as a primary component, both the extinction coefficient k of the dielectric layer with respect to the laser beam having a wavelength of 405 nm and the extinction coefficient k of the dielectric layer with respect to the laser beam having a wavelength of 680 nm increased and further increased as the amount of nitrogen added to the dielectric layer was increased.

Further, as shown in FIG. 14, it was found that both the extinction coefficient k of the dielectric layer with respect to the laser beam having a wavelength of 405 nm and the extinction coefficient k of the dielectric layer with respect to the laser beam having a wavelength of 680 nm were equal to zero when about 6 atomic % to about 10 atomic % of nitrogen was added to the dielectric layer but increased in accordance with increase in the amount of nitrogen added to the dielectric layer when it exceeded about 10 atomic %.

Moreover, as shown in FIG. 14, it was found that the extinction coefficient k of the dielectric layer with respect to the laser beam having a wavelength of 405 nm markedly decreased if nitrogen was added to the dielectric layer.

Then, a laser beam was projected onto the samples #1-1 and #1-2 and the refractive index n and the extinction coefficient k of each dielectric layer were measured while varying the wavelength of the laser beam in the range between 350 nm and 800 nm, whereby the relationship between the wavelength of the laser beam and the refractive index n of the dielectric layers and the relationship between the wavelength of the laser beam and the extinction coefficient k of the dielectric layers were obtained.

Figure 15:
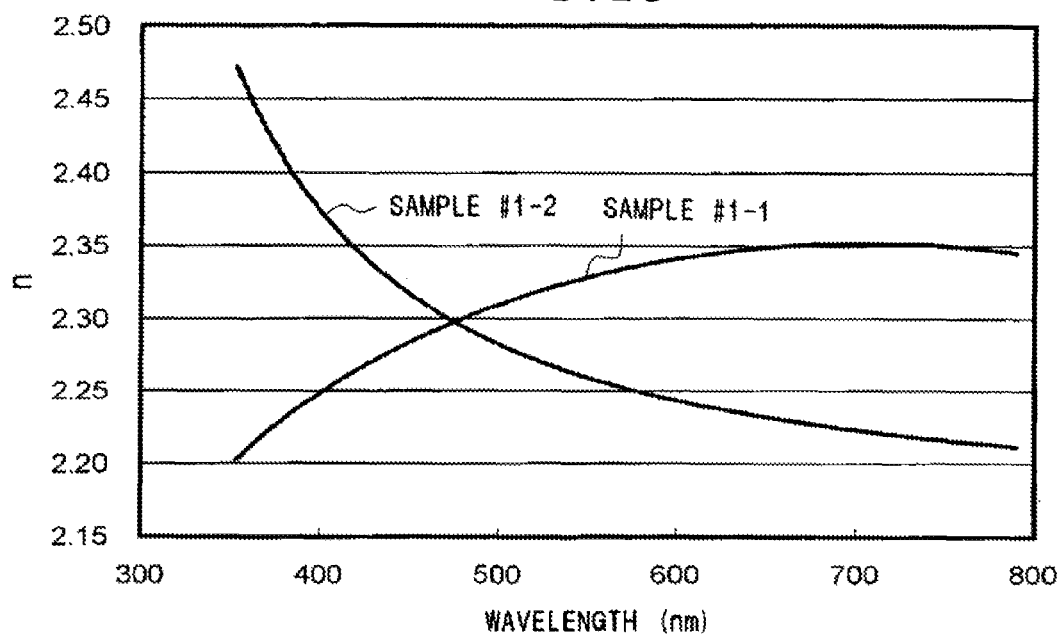
FIG. 15 is a graph showing the relationship between the wavelength of a laser beam and the refractive index n of a dielectric layer measured in Working Example 1.
Figure 16:
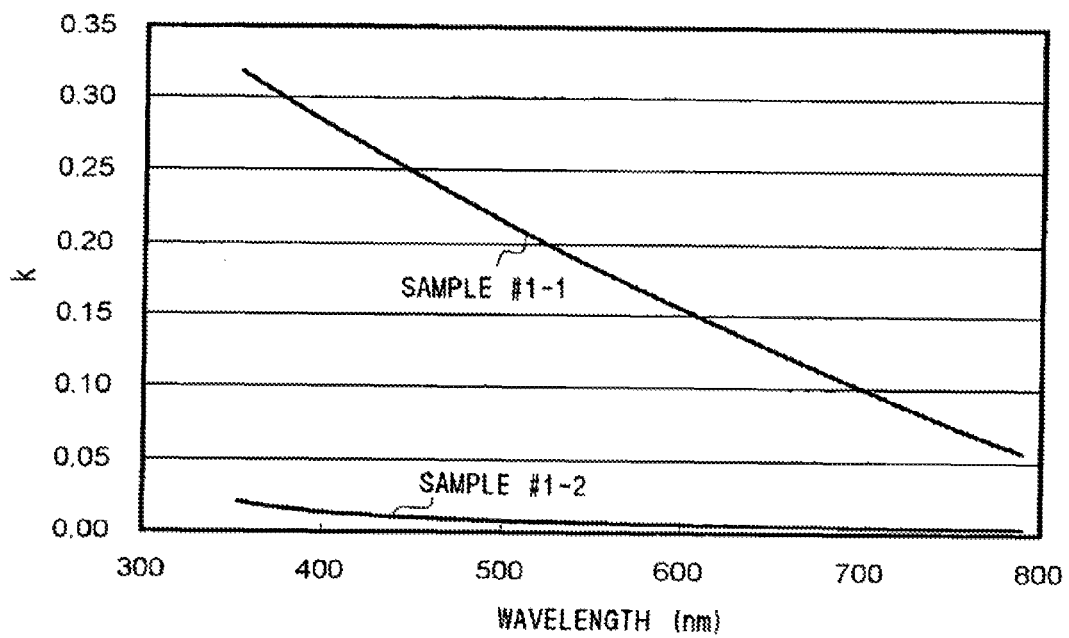
FIG. 16 is a graph showing the relationship between the wavelength of a laser beam and the extinction coefficient k of a dielectric layer measured in Working Example 1.

The result of measurement of the relationship between the wavelength of the laser beam and the refractive index n of the dielectric layers is shown in FIG. 15 and the result of measurement of the relationship between the wavelength of the laser beam and the extinction coefficient k of the dielectric layers is shown in FIG. 16.

As shown in FIG. 15, it was found that the refractive index n of the sample #1-1 including the dielectric layer containing $Ta_2O_5$ as a primary component but no nitrogen as an additive decreased as the wavelength of the laser beam became shorter, while the refractive index n of the sample #1-2 including the dielectric layer containing $Ta_2O_5$ as a primary component and 3.3 atomic % of nitrogen as an additive increased as the wavelength of the laser beam became shorter and that the refractive index n of the sample #1-2 was higher than that of the sample #1-1 with respect to the laser beam having a wavelength equal to or shorter than about 470 nm.

Further, as shown in FIG. 16, it was found that the extinction coefficient k of the sample #1-1 including the dielectric layer containing $Ta_2O_5$ as a primary component but no nitrogen as an additive increased substantially linearly as the wavelength of the laser beam became shorter, while the extinction coefficient k of the sample #1-2 including the dielectric layer containing $Ta_2O_5$ as a primary component and 3.3 atomic % of nitrogen as an additive was substantially constant even if the wavelength of the laser beam varied and that the extinction coefficient k of the sample #1-1 was higher than that of the sample #1-2 with respect to the laser beam having a wavelength of from 350 nm to 800 nm and the difference therebetween became larger as the wavelength of the laser beam became shorter.

Working Example 2

A disk-like polycarbonate substrate having a thickness of 1.1 mm and a diameter of 120 mm was first fabricated using an injection molding process.

The thus fabricated polycarbonate substrate was then set on a sputtering apparatus and a sputtering process was performed at a power of 800 W using a $TiO_2$ target, thereby forming a dielectric layer having a thickness of 30 nm and containing $TiO_2$ as a primary component on the surface of the polycarbonate substrate.

A mixed gas of argon gas and nitrogen gas was employed as a sputtering gas and samples #2-1 to #2-8 were fabricated to give their dielectric layers different nitrogen contents from each other by varying the flow rate of nitrogen from 0 to 35 SCCM.

The amount of nitrogen contained in the dielectric layer of each of the sample #2-1 to the sample #2-8 was measured and the relationship between the composition of the mixed gas used as the sputtering gas and the amounts of nitrogen added to the dielectric layers of the sample #2-1 to the sample #2-8 was determined.

The results of the measurement are shown in Table 2.

The amount of nitrogen added to each of the dielectric layers was obtained by multiplying the peak areas of the 2p peak of titanium (peak position: about 443.8 to 473.8 eV), the is peak of oxygen (peak position: about 523 to 543 eV) and the is peak of nitrogen (peak position: about 390 to 410 eV) measured by ESCA (Electron Spectroscopy for Chemical Analysis), namely, XPS (X-ray photoelectron spectroscopy) by the corresponding sensitivity factors of the peaks, namely, 1.703 of that of the 2p peak of titanium, 2.994 of that of the 1 s peak of oxygen and 4.505 of that of the 1 s peak of nitrogen.

TABLE 2

|  | Flow rate of Ar gas (sccm) | Flow rate of $N_2$ gas (sccm) | Amount of Nitrogen (atomic %) |
| --- | --- | --- | --- |
| Sample #2-1 | 55 | 0 | 0 |
| Sample #2-2 | 52 | 3 | 1.7 |
| Sample #2-3 | 50 | 5 | 2.9 |
| Sample #2-4 | 47 | 8 | 3.1 |
| Sample #2-5 | 45 | 10 | 3.3 |
| Sample #2-6 | 40 | 15 | 3.9 |
| Sample #2-7 | 30 | 25 | 5.1 |
| Sample #2-8 | 20 | 35 | 5.7 |

Then, a laser beam having a wavelength of 405 nm and a laser beam having a wavelength of 680 nm were projected onto each of the samples #2-1 to #2-8, whereby the refractive index n and the extinction coefficient k thereof were measured and the relationship between the amount (atomic %) of nitrogen added to the dielectric layers and the refractive index n of the dielectric layer and the relationship between the amount (atomic %) of nitrogen added to the dielectric layers and the extinction coefficient k of the dielectric layers were obtained.

Figure 17:
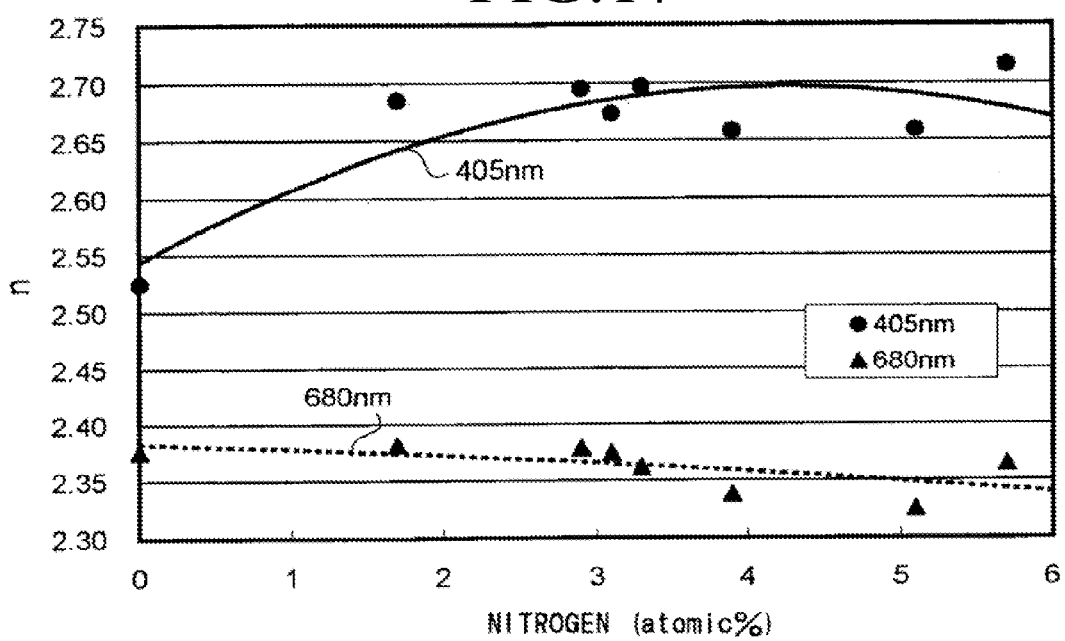
FIG. 17 is a graph showing the relationship between the amount of nitrogen added to a dielectric layer and the refractive index n of the dielectric layer measured in Working Example 2.
Figure 18:
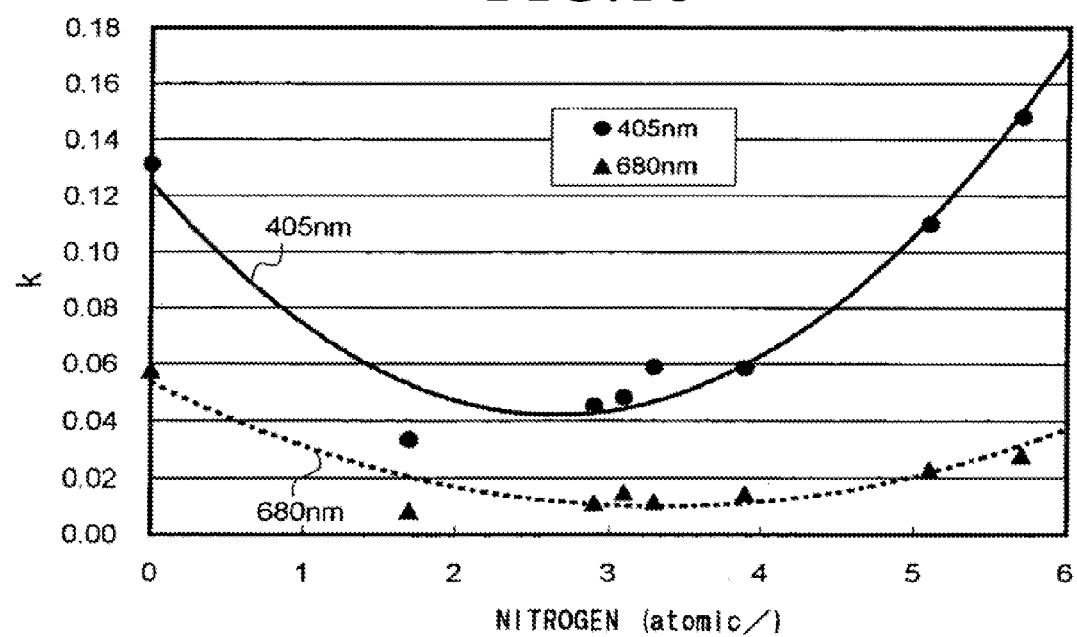
FIG. 18 is a graph showing the relationship between the amount of nitrogen added to a dielectric layer and the extinction coefficient k of the dielectric layer measured in Working Example 2.

The thus obtained relationship between the amount (atomic %) of nitrogen added to the dielectric layers and the refractive index n of the dielectric layers is shown in FIG. 17 and the relationship between the amount (atomic %) of nitrogen added to the dielectric layers and the extinction coefficient k of the dielectric layers is shown in FIG. 18.

As shown in FIG. 17, it was found that the refractive index n of the dielectric layer with respect to the laser beam having a wavelength of 405 nm increased as the amount (atomic %) of nitrogen added to the dielectric layer containing $TiO_2$ as a primary component was increased but when the amount of the nitrogen to the dielectric layer exceeded about 4.5 atomic %, it gradually decreased as the amount (atomic %) of nitrogen added to the dielectric layer containing $TiO_2$ as a primary component was increased.

To the contrary, as shown in FIG. 17, it was found that the refractive index n of the dielectric layer with respect to the laser beam having a wavelength of 680 nm was substantially constant even if nitrogen was added to the dielectric layer containing $TiO_2$ as a primary component.

On the other hand, as shown in FIG. 18, it was found that the extinction coefficient k of the dielectric layer with respect to the laser beam having a wavelength of 405 nm decreased as the amount of nitrogen added to the dielectric layer was increased but that when the amount of nitrogen exceeded about 2.7 atomic %, the extinction coefficient k thereof increased.

Further, as shown in FIG. 18, it was found that the extinction coefficient k of the dielectric layer with respect to the laser beam having a wavelength of 680 nm decreased as the amount of nitrogen added to the dielectric layer was increased but that when the amount of nitrogen exceeded about 3 atomic %, the extinction coefficient k thereof increased.

Then, a laser beam was projected onto the samples #2-1 and #2-3 and the refractive index n and the extinction coefficient k of the dielectric layers were measured while varying the wavelength of the laser beam in the range between 350 nm and 800 nm, whereby the relationship between the wavelength of the laser beam and the refractive index n of the dielectric layer and the relationship between the wavelength of the laser beam and the extinction coefficient k of the dielectric layer were determined.

Figure 19:
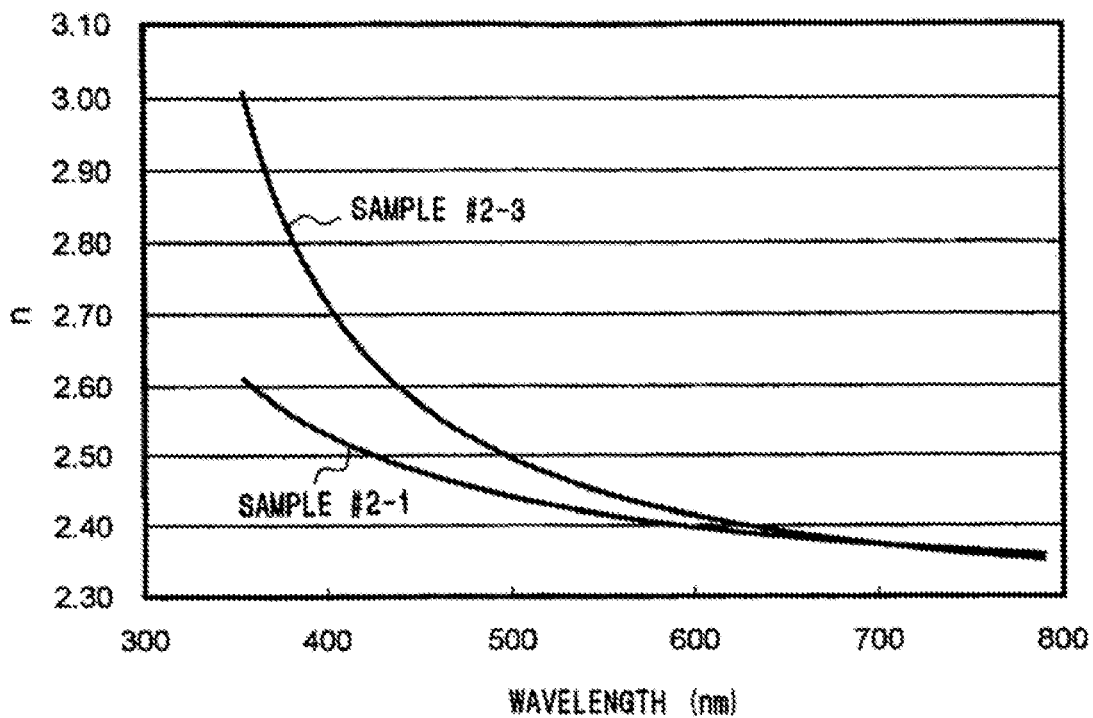
FIG. 19 is a graph showing the relationship between the wavelength of a laser beam and the refractive index n of a dielectric layer measured in Working Example 2.
Figure 20:
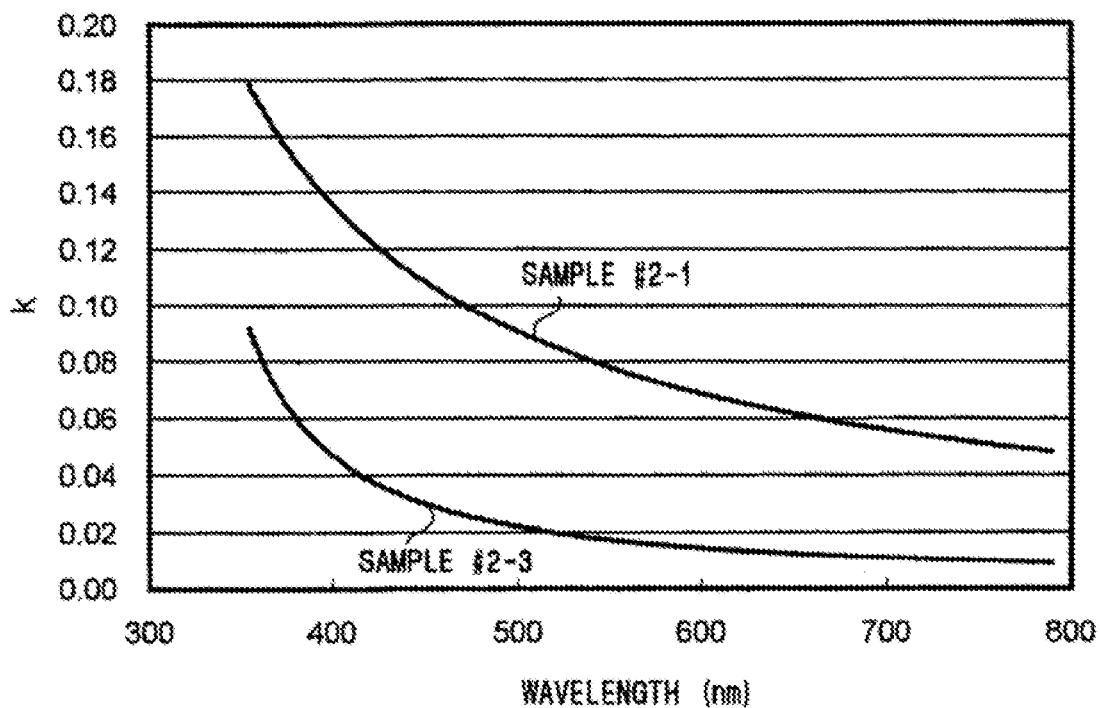
FIG. 20 is a graph showing the relationship between the wavelength of a laser beam and the extinction coefficient k of a dielectric layer in Working Example 2.

The result of measurement of the relationship between the wavelength of the laser beam and the refractive index n of the dielectric layer is shown in FIG. 19 and the result of measurement of the relationship between the wavelength of the laser beam and the extinction coefficient k of the dielectric layer is shown in FIG. 20.

As shown in FIG. 19, it was found that the refractive index n of the sample #2-1 including the dielectric layer containing $TiO_2$ as a primary component but no nitrogen as an additive did not greatly change even if the wavelength of the laser beam became shorter, while the refractive index n of the sample #2-3 including the dielectric layer containing $TiO_2$ as a primary component and 2.9 atomic % of nitrogen as an additive increased as the wavelength of the laser beam became shorter and the refractive index n thereof was very large with respect to the laser beam in the blue wavelength band.

Further, as shown in FIG. 20, it was found that both the extinction coefficient k of the sample #2-1 including the dielectric layer containing $TiO_2$ as a primary component but no nitrogen as an additive and the extinction coefficient k of the sample #2-3 including the dielectric layer containing $TiO_2$ as a primary component and 2.9 atomic % of nitrogen as an additive increased as the wavelength of the laser beam became shorter and that the extinction coefficient k of the sample #2-1 was larger than that of the sample #2-3 irrespective of the wavelength of the laser beam.

Working Example 3

An optical recording medium sample #3-1 was fabricated in the following manner.

A disk-like polycarbonate substrate having a thickness of 1.1 mm and a diameter of 120 mm and formed with grooves and lands on the surface thereof was first fabricated by an injection molding process so that the track pitch (groove pitch) was equal to 0.32 μm.

Then, the polycarbonate substrate was set on a sputtering apparatus and a reflective film consisting of an alloy of Ag, Pd and Cu and having a thickness of 100 nm, a fourth dielectric film containing a mixture of ZnS and $SiO_2$ and having a thickness of 27 nm, a second L0 recording film containing Cu as a primary component, added with 23 atomic % of Al and 13 atomic % of Au and having a thickness of 5 nm, a first L0 recording film containing Si as a primary component and having a thickness of 5 nm and a third dielectric film containing the mixture of ZnS and $SiO_2$ and having a thickness of 25 nm were sequentially formed on the surface of the polycarbonate substrate on which the grooves and lands were formed, using the sputtering process, thereby forming an L1 layer on the surface of the polycarbonate substrate.

The mole ratio of ZnS to $SiO_2$ in the mixture of ZnS and $SiO_2$ contained in the third dielectric layer and the fourth dielectric layer was 80:20.

Further, the polycarbonate substrate formed with the L0 layer on the surface thereof was set on a spin coating apparatus and the third dielectric film was coated with a resin solution prepared by dissolving acrylic ultraviolet curable resin in a solvent to form a coating layer while the polycarbonate substrate was being rotated. Then, a stamper formed with grooves and lands was placed on the surface of the coating layer and the surface of the coating layer was irradiated with an ultraviolet ray via the stamper, thereby curing the acrylic ultraviolet curable resin. A transparent intermediate layer having a thickness of 20 μm and formed with grooves and lands on the surface thereof so that the track pitch (groove pitch) was equal to 0.32 μm was formed by removing the stamper.

Then, the polycarbonate substrate formed with the L0 layer and the transparent intermediate layer on the surface thereof was set on the sputtering apparatus and a second dielectric film containing a mixture of ZnS and $SiO_2$ and having a thickness of 13 nm, a second L1 recording film containing Cu as a primary component, added with 23 atomic % of Al and 13 atomic % of Au and having a thickness of 5 nm, a first L1 recording film containing Si as a primary component and having a thickness of 5 nm and a first dielectric film containing $TiO_2$ as a primary component and 2.9 atomic % of nitrogen as an additive and having a thickness of 27 nm were sequentially formed on the surface of the transparent intermediate layer formed on the L0 layer using the sputtering process, thereby forming an L1 layer on the surface of the transparent intermediate layer.

The mole ratio of ZnS to $SiO_2$ in the mixture of ZnS and $SiO_2$ contained in the second dielectric layer was 80:20.

Further, the first dielectric film was coated using the spin coating method with a resin solution prepared by dissolving acrylic ultraviolet curing resin in a solvent to form a coating layer and the coating layer was irradiated with ultraviolet rays, thereby curing the acrylic ultraviolet curing resin to form a protective layer having a thickness of 80 μm. Thus, the optical recording medium sample # 3-1 was fabricated.

Comparative Example 1

An optical recording medium comparative sample #1 was fabricated in the manner of the optical recording medium sample #3-1 except that the second dielectric film was formed so as to have a thickness of 16 nm and the first dielectric film was formed so as to contain a mixture of ZnS and $SiO_2$ and have a thickness of 31 nm.

The mole ratio of ZnS to $SiO_2$ in the mixture of ZnS and $SiO_2$ was 80:20.

Comparative Example 2

An optical recording medium comparative sample #2 was fabricated in the manner of the optical recording medium sample #3-1 except that the second dielectric film was formed so as to contain $TiO_2$ as a primary component and 2.9 atomic % of nitrogen as an additive and have a thickness of 20 nm.

Comparative Example 3

An optical recording medium comparative sample #3 was fabricated in the manner of the optical recording medium comparative sample #2 except that the second dielectric film was formed so as to have a thickness of 14 nm and the first dielectric film was formed so as to contain a mixture of ZnS and $SiO_2$ and have a thickness of 31 nm.

The mole ratio of ZnS to $SiO_2$ in the mixture of ZnS and $SiO_2$ was 80:20.

Each of the optical recording medium sample #3-1, the optical recording medium comparative sample #1, the optical recording medium comparative sample #2 and the optical recording medium comparative sample #3 was set in a DDU1000 optical recording medium evaluation apparatus manufactured by Pulstec Industrial Co., Ltd. and a laser beam having a wavelength of 405 nm was condensed onto the L1 layer using an objective lens whose numerical aperture was 0.85 via the light transmission layer while each sample was rotated at a linear velocity of 5.3 m/sec, thereby recording 2T signals therein.

The power of the laser beam was modulated using the pulse pattern shown in FIG. 9 where the intermediate power Pm was fixed at 1.5 mW and the ground power Pb was fixed at 0.1 mW, whereas the recording power Pw was varied.

Data recorded in each of the optical recording medium sample #3-1, the optical recording medium comparative sample #1, the optical recording medium comparative sample #2 and the optical recording medium comparative sample #3 were then reproduced using the optical recording medium evaluation apparatus mentioned above and the C/N ratio of a reproduced signal was measured. The power of the laser beam was set to 0.7 mW.

Figure 21:
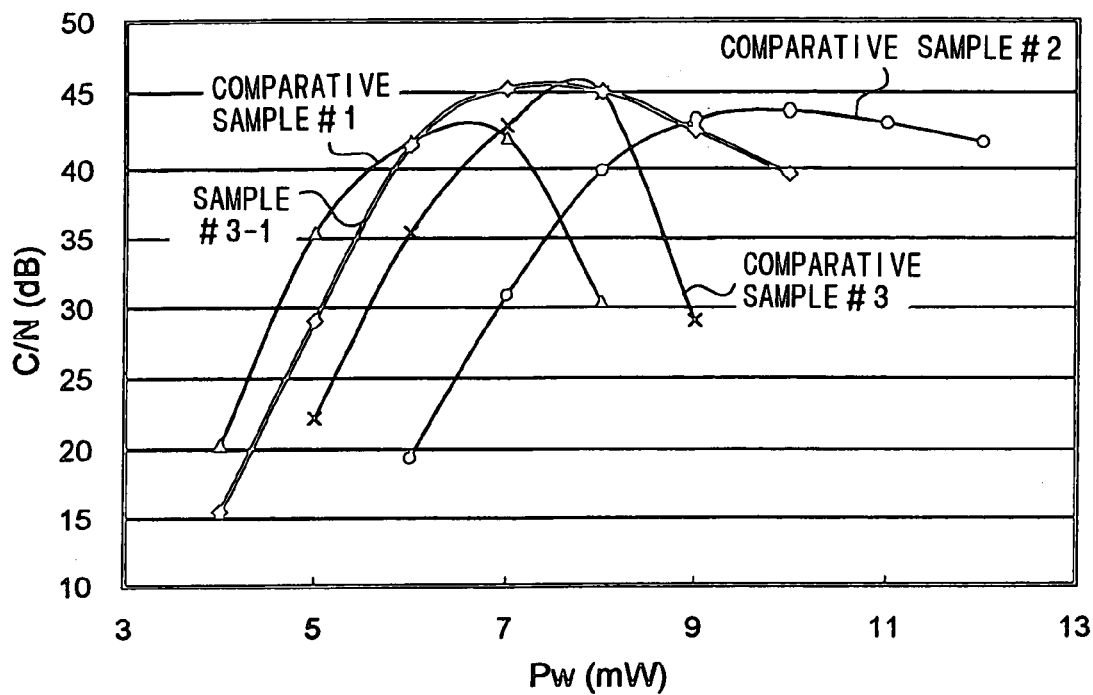
FIG. 21 is a graph showing measurement results of the C/N ratio of a signal obtained by reproducing data recorded in each of an optical recording medium sample #3-1, an optical recording medium comparative sample #1, an optical recording medium comparative sample #2 and an optical recording medium comparative sample #3.

The results of the measurement are shown in FIG. 21.

As shown in FIG. 21, the C/N ratio of the signal obtained by reproducing data recorded in the optical recording medium sample #3-1 was highest.

Further, each of the optical recording medium sample #3-1, the optical recording medium comparative sample #1, the optical recording medium comparative sample #2 and the optical recording medium comparative sample #3 was set in a DDU1000 optical recording medium evaluation apparatus manufactured by Pulstec Industrial Co., Ltd. and, similarly to the above, random signals including a 2T signal to a 8T signal were recorded in the L1 layer thereof.

Data recorded in each of the optical recording medium sample #3-1, the optical recording medium comparative sample #1, the optical recording medium comparative sample #2 and the optical recording medium comparative sample #3 were then reproduced using the optical recording medium evaluation apparatus mentioned above and clock jitter of a reproduced signal obtained from a track between tracks in which data were recorded was measured. The fluctuation σ of a reproduced signal was measured using a time interval analyzer and the clock jitter was calculated as σ/Tw, where Tw was one clock period.

Figure 22:
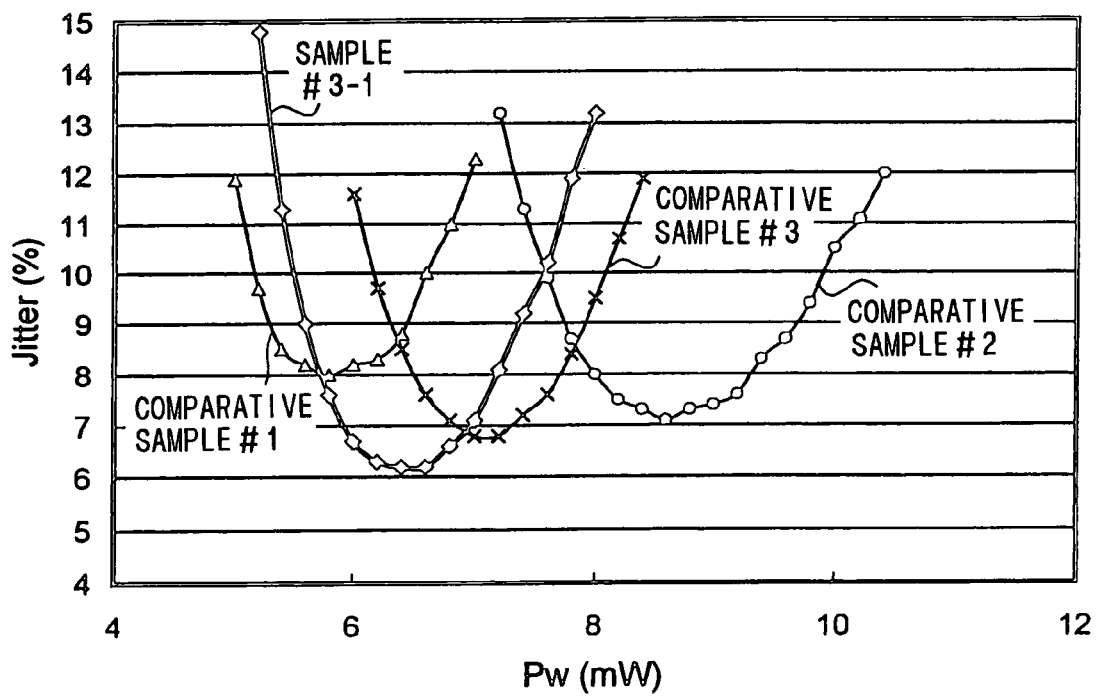
FIG. 22 is a graph showing measurement results of clock jitter of a signal obtained by reproducing data recorded in each of an optical recording medium sample #3-1, an optical recording medium comparative sample #1, an optical recording medium comparative sample #2 and an optical recording medium comparative sample #3.

The results of the measurement are shown in FIG. 22.

Further, the recording power Pw at which the clock jitter of a reproduced signal was lowest and modulation of the signal obtained by reproducing data recorded at the recording power Pw were measured for each of the optical recording medium sample #3-1, the optical recording medium comparative sample #1, the optical recording medium comparative sample #2 and the optical recording medium comparative sample #3.

The results of the measurement are shown in Table 3.

TABLE 3

|  | Recording power (Pw) (mW) | Jitter (%) | Modulation (%) |
|---|---|---|---|
| Sample #3-1 | 6.4 | 6.2 | 51.8 |
| Comparative Sample #1 | 5.8 | 8.0 | 42.3 |
| Comparative Sample #2 | 8.6 | 7.1 | 44.4 |
| Comparative Sample #3 | 7.0 | 6.8 | 47.6 |

As shown in FIG. 22 and Table 3, it was found that the clock jitter of the signal obtained by reproducing data recorded in the optical recording medium sample #3-1 was lowest.

Further, the recording power Pw at which the clock jitter of a reproduced signal was lowest was 6.4 mW and the recording sensitivity of the optical recording medium sample #3-1 was excellent.

Furthermore, it was found that modulation of the signal obtained by reproducing data recorded at the recording power Pw at which the clock jitter of a reproduced signal was lowest was 51.8% and highest.

The present invention has thus been shown and described with reference to specific embodiments and working examples. However, it should be noted that the present invention is in no way limited to the details of the described arrangements but changes and modifications may be made without departing from the scope of the appended claims.

For example, in the above described embodiment, although the first L0 recording film 23*a* and the second L0 recording film 23*b* of the L0 layer 20 are formed in contact with each other it is not absolutely necessary to form the first L0 recording film 23*a* and the second L0 recording film 23*b* of the L0 layer 20 in contact with each other but it is sufficient for the second L0 recording film 23*b* to be so located in the vicinity of the first L0 recording film 23*a* as to enable formation of a mixed region including the primary component element of the first L0 recording film 23*a* and the primary component element of the second L0 recording film 23*b* when the region is irradiated with a laser beam. Further, one or more other films such as a dielectric film may be interposed between the first L0 recording film 23*a* and the second L0 recording film 23*b*.

Further, in the above described embodiment, although the first L1 recording film 33*a* and the second L1 recording film 33*b* of the L1 layer 30 are formed in contact with each other it is not absolutely necessary to form the first L1 recording film 33*a* and the second L1 recording film 33*b* of the L1 layer 30 in contact with each other but it is sufficient for the second L1 recording film 33*b* to be so located in the vicinity of the first L1 recording film 33*a* as to enable formation of a mixed region including the primary component element of the first L1 recording film 33*a* and the primary component element of the second L1 recording film 33*b* when the region is irradiated with a laser beam. Further, one or more other films such as a dielectric film may be interposed between the first L1 recording film 33*a* and the second L1 recording film 33*b*.

Furthermore, in the above described embodiment, although the L0 layer 20 includes the first L0 recording film 23a and the second L0 recording film 23b, the L0 layer 20 may include one or more recording films containing the same element as a primary component as that contained in the first L0 recording film 23a as a primary component or one or more recording films containing the same element as a primary component as that contained in the second L0 recording film 23b as a primary component, in addition to the first L0 recording film 23a and the second L0 recording film 23b.

Moreover, in the above described embodiment, although the L1 layer 30 includes the first L1 recording film 33a and the second L1 recording film 33b, the L1 layer 30 may include one or more recording films containing the same element as a primary component as that contained in the first L1 recording film 33a as a primary component or one or more recording films containing the same element as a primary component as that contained in the second L1 recording film 33b as a primary component, in addition to the first L1 recording film 33a and the second L1 recording film 33b.

Further, in the above described embodiment, although each of the first L0 recording film 23a and the first L1 recording film 33a contains Si as a primary component, it is not absolutely necessary for each of the first L0 recording film 23a and the first L1 recording film 33a to contain Si as a primary component and each of the first L0 recording film 23a and the first L1 recording film 33a may contain an element selected from the group consisting of Ge, Sn, Mg, In, Zn, Bi and Al instead of Si.

Moreover, in the above described embodiment, although each of the second L0 recording film 23b and the second L1 recording film 33b contains Cu as a primary component, it is not absolutely necessary for each of the second L0 recording film 23b and the second L1 recording film 33b to contain Cu as a primary component and each of the second L0 recording film 23b and the second L1 recording film 33b may contain an element selected from the group consisting of Al, Zn, Ti and Ag instead of Cu.

Furthermore, in the above described embodiment, although the first L0 recording film 23a is disposed on the side of the light transmission layer 13 and the second L0 recording film 23b is disposed on the side of the support substrate 11, it is possible to dispose the first L0 recording film 23a on the side of the support substrate 11 and the second L0 recording film 23b on the side of the light transmission layer 13.

Moreover, in the above described embodiment, although the first L1 recording film 33a is disposed on the side of the light transmission layer 13 and the second L1 recording film 33b is disposed on the side of the support substrate 11, it is possible to dispose the first L1 recording film 33a on the side of the support substrate 11 and the second L1 recording film 33b on the side of the light transmission layer 13.

Further, in the above described embodiment, although the L1 layer 30 includes the first L1 recording film 33a containing Si as a primary component and the second recording film 33b containing Cu as a primary component, it is not absolutely necessary for the L1 layer 30 to include the first L1 recording film 33a containing Si as a primary component and the second recording film 33b containing Cu as a primary component and the L1 layer 30 may include only a single recording film.

Furthermore, in the above described embodiment, although the L0 layer 20 includes the first L0 recording film 23a containing Si as a primary component and the second recording film 23b containing Cu as a primary component, it is not absolutely necessary for the L0 layer 20 to include the first L0 recording film 23a containing Si as a primary component and the second recording film 23b containing Cu as a primary component and the L0 layer 20 may include only a single recording film. Further, the L0 layer 20, which is the lowest information recording layer, may be formed by pits.

Moreover, in the above described embodiment, although the L1 layer 30 includes no reflective film, it is not absolutely necessary for the L1 layer 30 to include no reflective film and the L1 layer 30 may include a reflective film thinner than the reflective film 21 included in the L0 layer 20.

Further, in the above described embodiment, although the first dielectric film 34 contains $Ta_2O_5$ or $TiO_2$ as a primary component, it is not absolutely necessary for the first dielectric film 34 to contain $Ta_2O_5$ or $TiO_2$ as a primary component and the first dielectric film 34 may contain an oxide other than $Ta_2O_5$ and $TiO_2$ as a primary component.

Moreover, in the above described embodiment, although the second dielectric film 32 is formed of the mixture of ZnS and $SiO_2$, it is not absolutely necessary for the second dielectric film 32 to be formed of the mixture of ZnS and $SiO_2$ and it is sufficient for the second dielectric film 32 to be formed of a material having a lower thermal conductivity than that of the first dielectric film 34.

Further, in the above described embodiment, although the third dielectric film 24 and the fourth dielectric film 22 are formed of the mixture of ZnS and $SiO_2$, it is not absolutely necessary for the third dielectric film 24 and the fourth dielectric film 22 to be formed of the mixture of ZnS and $SiO_2$ and the third dielectric film 24 and the fourth dielectric film 22 may be formed of oxide, sulfide, nitride of Al, Si, Ce, Zn, Ta, Ti and the like such as $Al_2O_3$, AlN, $SiO_2$, $Si_3N_4$, $CeO_2$, ZnS, TaO and the like or a combination thereof.

Furthermore, in the above described embodiment, although the optical recording medium 10 includes the L0 layer 20 and the L1 layer 30 as information recording layers, it is not absolutely necessary for the optical recording medium 10 to include the L0 layer 20 and the L1 layer 30 as information recording layers and the optical recording medium may include three or more information recording layers. In the case where the optical recording medium includes three or more information recording layers, it is preferable, but not absolutely necessary, for dielectric films included in all information recording layers other than the farthest information recording layer from a light incidence plane 13a and located on the side of the light incidence plane 13a to contain $Ta_2O_5$ or $TiO_2$ as a primary component and nitrogen as an additive. It is sufficient for a dielectric layer included in at least one information recording layer other than the farthest information recording layer from a light incidence plane 13a and located on the side of the light incidence plane 13a to contain $Ta_2O_5$ or $TiO_2$ as a primary component and nitrogen as an additive and for a dielectric layer thereof on the side of the support substrate 11 to be formed of a material having a lower thermal conductivity than that of the dielectric layer located on the side of the light incidence plane 13a.

Moreover, in the above described embodiment, although the optical recording medium 10 includes the light transmission layer 13 and is constituted so that a laser beam L is projected onto the L0 layer 20 and the L1 layer 30 via the light transmission layer 13, the present invention is not limited to an optical recording medium having such a configuration and the optical recording medium may include an L0 layer 20 and an L1 layer 30 between a substrate formed of a light transmittable material and a protective layer and be constituted so that a laser beam L is projected onto the L0 layer 20 and the L1 layer 30 via the substrate.

According to the present invention, it is possible to provide an optical recording medium which includes a plurality of information recording layers and in which the heat radiation characteristic and the optical property of information recording layer(s) other than the information recording layer farthest from a light incidence plane are improved.

The invention claimed is:

1. An optical recording medium comprising a substrate, a protective layer and a plurality of information recording layers between the substrate and the protective layer which are laminated via at least one intermediate transparent layer and capable of recording data in the plurality of information recording layers and reproducing data recorded in the plurality of information recording layers by projecting a laser beam via a light incidence plane constituted by one surfaces of the substrate or one surface of the protective layer onto the plurality of information recording layers, at least one information recording layer other than a farthest information recording layer from the light incidence plane among the plurality of information recording layers including at least one recording film, a first dielectric film located on a side of the light incidence plane with respect to the at least one recording film and containing an oxide as a primary component and added with nitrogen, and a second dielectric film located on an opposite side of the light incidence plane with respect to the at least one recording film and having a lower thermal conductivity than that of the first dielectric film, wherein the at least one information recording layer is constituted by a first recording film containing one element selected from a group consisting of Si, Ge, Sn, Mg, In, Zn, Bi and Al as a primary component and a second recording film provided in a vicinity of the first recording film and containing one element selected from a group consisting of Cu, Al, Zn, Ti and Ag and different from the element contained in the first recording film as a primary component and when the laser beam is projected, the element contained in the first recording film as the primary component and the element contained in the second recording film as the primary component are mixed with each other, thereby forming a record mark.

2. The optical recording medium in accordance with claim 1, wherein the first dielectric film contains $Ta_2O_5$ or $TiO_2$ as the primary component.

3. The optical recording medium in accordance with claim 1, wherein the second dielectric film is formed of a mixture of ZnS and $SiO_2$.

4. The optical recording medium in accordance with claim 1, wherein the second recording film is formed so as to be in contact with the first recording film.

5. The optical recording medium in accordance with claim 1, wherein the first recording film contains Si as the primary component and the second recording film contains Cu as the primary component.

6. The optical recording medium in accordance with claim 5, wherein at least one element selected from a group consisting of Al, Zn, Sn, Mg and Au and different from the element contained in the second recording film as the primary component is added to the second recording film.

7. The optical recording medium in accordance with claim 5, wherein the protective layer is formed of a light transmittable material and the laser beam is projected onto the plurality of information recording layers via the protective layer.

8. The optical recording medium in accordance with claim 5, wherein the second recording film is formed so as to be in contact with the first recording film.

9. The optical recording medium in accordance with claim 1, wherein at least one element selected from a group consisting of Al, Zn, Sn, Mg and Au and different from the element contained in the second recording film as the primary component is added to the second recording film.

10. The optical recording medium in accordance with claim 1, wherein the protective layer is formed of a light transmittable material and the laser beam is projected onto the plurality of information recording layers via the protective layer.

* * * * *